US012322327B2

(12) United States Patent
Kim et al.

(10) Patent No.: US 12,322,327 B2
(45) **Date of Patent: *Jun. 3, 2025**

(54) DISPLAY DEVICE AND DRIVING METHOD THEREOF

(71) Applicant: Samsung Display Co., Ltd., Yongin-si (KR)

(72) Inventors: Jihye Kim, Hwaseong-si (KR); Yu-Chol Kim, Jeonju-si (KR); Seongoh Yeom, Asan-si (KR); Jakyoung Jin, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,844

(22) Filed: Feb. 27, 2024

(65) Prior Publication Data

US 2024/0203329 A1 Jun. 20, 2024

Related U.S. Application Data

(63) Continuation of application No. 17/863,893, filed on Jul. 13, 2022, now Pat. No. 11,948,498.

(30) Foreign Application Priority Data

Oct. 19, 2021 (KR) ........................ 10-2021-0138899

(51) Int. Cl.
*G09G 3/32* (2016.01)

(52) U.S. Cl.
CPC ....... *G09G 3/32* (2013.01); *G09G 2300/0426* (2013.01); *G09G 2300/0852* (2013.01); *G09G 2310/0267* (2013.01); *G09G 2310/0275* (2013.01); *G09G 2310/061* (2013.01)

(58) Field of Classification Search
CPC ............. G09G 3/32; G09G 2300/0426; G09G 2300/0852; G09G 2310/0267; G09G 2310/0275; G09G 2310/061; G09G 2300/0819; G09G 2300/0861; G09G 2320/0233; G09G 2320/0238;
(Continued)

(56) References Cited

U.S. PATENT DOCUMENTS

| | | | | |
|---|---|---|---|---|
| 11,037,506 | B2 * | 6/2021 | Noh | G09G 3/3275 |
| 11,158,266 | B2 | 10/2021 | Baek et al. | |
| 2021/0248961 | A1 | 8/2021 | Yang et al. | |

FOREIGN PATENT DOCUMENTS

| | | | |
|---|---|---|---|
| KR | 20190138718 | A | 12/2019 |
| KR | 20200075945 | A | 6/2020 |
| KR | 20210100785 | A | 8/2021 |

* cited by examiner

*Primary Examiner* — Andrew Sasinowski
(74) *Attorney, Agent, or Firm* — CANTOR COLBURN LLP

(57) ABSTRACT

A display device includes a light-emitting device, a first transistor, and a second transistor connected between the first transistor and the light-emitting device and including a gate electrode which receives the emission control signal. When a driving frequency is a second frequency less than a first frequency, one frame includes an active period and a blank period, and during the active period, a pulse width of the emission control signal has a first value, and during the blank period, the pulse width of the emission control signal has a second value different from the first value.

21 Claims, 18 Drawing Sheets

(58) Field of Classification Search
CPC ..... G09G 2320/064; G09G 2340/0435; G09G 3/3233; G09G 2310/0264; H01L 27/1214
See application file for complete search history.

DISPLAY DEVICE AND DRIVING METHOD THEREOF

This application is a continuation of U.S. patent application Ser. No. 17/863,893, filed on Jul. 13, 2022, which claims priority to Korean Patent Application No. 10-2021-0138899, filed on Oct. 19, 2021, and all the benefits accruing therefrom under 35 U.S.C. § 119, the content of which in its entirety is herein incorporated by reference.

BACKGROUND

1. Field

Embodiments of the invention relate to a display device.

2. Description of the Related Art

Electronic devices such as a smart phone, a digital camera, a notebook computer, a navigation device, a smart television, and the like that provide images to a user include a display device for displaying the images. The display device generates the image and then provides the user with the generated image through a display screen.

The display device includes a plurality of pixels and driving circuits (e.g., a scan driving circuit, a data driving circuit, and a light emission driving circuit) for controlling the plurality of pixels. Each of the plurality of pixels includes a display element and a pixel circuit for controlling the display element. The pixel circuits of the pixel may include a plurality of organically connected transistors.

To improve image quality, there is a growing need for a display device capable of operating at various driving frequencies.

SUMMARY

Embodiments of the invention provide a display device capable of operating at various driving frequencies and a driving method thereof.

In an embodiment of the invention, a display device includes a light-emitting device, a first transistor, and a second transistor connected between the first transistor and the light-emitting device and including a gate electrode which receives an emission control signal. When a driving frequency is a second frequency less than a first frequency, one frame includes an active period and a blank period, and during the active period, a pulse width of the emission control signal has a first value, and during the blank period, the pulse width of the emission control signal has a second value different from the first value.

In an embodiment, the emission control signal may include an off-section in which the second transistor is turned off and an on-section in which the second transistor is turned on, and the off-section may correspond to the pulse width of the emission control signal.

In an embodiment, a frequency of the emission control signal may be higher than the first frequency.

In an embodiment, the blank period may include a first hold section and a second hold section, during the first hold section, the pulse width of the emission control signal may have the second value, and, during the second hold section, the pulse width of the emission control signal may have the first value.

In an embodiment, the blank period may include a first blank period and a second blank period, the first blank period may include a first hold section and a second hold section, the second blank period may include a third hold section and a fourth hold section, and in each of the first hold section and the third hold section, the pulse width of the emission control signal may have the second value, and in each of the second hold section and the fourth hold section, the pulse width of the emission control signal may have the first value.

In an embodiment, the blank period may include a first blank period and a second blank period, the first blank period may include a first hold section and a second hold section, the second blank period may include a third hold section and a fourth hold section, and in each of the first hold section and the second hold section, the pulse width of the emission control signal may have the second value, and in each of the third hold section and the fourth hold section, the pulse width of the emission control signal may have a third value greater than the second value.

In an embodiment, the blank period may include a first blank period and a second blank period, the first blank period may include a first hold section and a second hold section, the second blank period may include a third hold section and a fourth hold section, in the first hold section, the pulse width of the emission control signal may have the second value, and in the second hold section, the pulse width of the emission control signal may have a third value greater than the second value, in the third hold section, the pulse width of the emission control signal may have a fourth value greater than the third value, and in the fourth hold section, the pulse width of the emission control signal may have a fifth value greater than the fourth value.

In an embodiment, the display device may further include a first driving voltage line, the first transistor may include a first electrode connected to the first driving voltage line, a second electrode, and a gate electrode, and the second transistor may include a first electrode connected to the second electrode of the first transistor and a second electrode connected to the light-emitting device.

In an embodiment, the display device may further include a first node, a first capacitor connected between the first driving voltage line and the first node, a second capacitor connected between the first node and the gate electrode of the first transistor, a third transistor coupled between the second electrode of the first transistor and the gate electrode of the first transistor, a fourth transistor connected between the gate electrode of the first transistor and a second driving voltage line, a fifth transistor connected between the first node and a third driving voltage line, a sixth transistor connected between a data line and the first node, and a seventh transistor connected between the second electrode of the second transistor and the second driving voltage line.

In an embodiment, a gate electrode of the sixth transistor may receive a scan signal, and the scan signal may transition to an active level such that the sixth transistor is turned on during the active period, and may be maintained at an inactive level during the blank period.

In an embodiment of the invention, a display device includes a display panel including a pixel connected to scan lines, an emission control line, and a data line, a scan driving circuit that outputs scan signals respectively to the scan lines, a light emission driving circuit that outputs an emission control signal to the emission control line, and a driving controller that controls the scan driving circuit and the light emission driving circuit. The pixel includes a light-emitting device, a first transistor, and a second transistor connected between the first transistor and the light-emitting device and including a gate electrode which receives the emission control signal, and when a driving frequency is a second frequency less than a first frequency, one frame includes an active period and a blank period, and during the active period, a pulse width of the emission control signal has a first value, and during the blank period, the pulse width of the emission control signal has a second value different from the first value.

In an embodiment, the driving controller may set the pulse width of the emission control signal to the first value during the active period when the driving frequency is the second frequency in a variable frequency mode, and may provide a light emission driving signal which sets the pulse width of the emission control signal to the second value to the light emission driving circuit during the blank period, and the light emission driving circuit may output the emission control signal in response to the light emission driving signal.

In an embodiment, the driving controller may include a mode determiner that receives a control signal, to determine an operation mode based on the control signal, and to output a mode signal, a first counter that outputs a first count signal in response to the control signal when the mode signal indicates the variable frequency mode, a second counter that outputs a second count signal when the mode signal indicates the variable frequency mode, and a control signal generator that outputs the light emission driving signal in response to the control signal, the mode signal, the first count signal, and the second count signal.

In an embodiment, when the mode signal indicates the variable frequency mode, the first count signal is greater than a preset value, and the second count signal is a first count value, the control signal generator may include a control signal generator that outputs the light emission driving signal which sets the pulse width of the emission control signal to the second value.

In an embodiment, when the mode signal indicates the variable frequency mode, the first count signal is greater than a preset value, and the second count signal is a first count value, the control signal generator may include a control signal generator that outputs the light emission driving signal which sets the pulse width of the emission control signal to the first value.

In an embodiment, when the mode signal indicates the variable frequency mode and the first count signal is equal to or less than a preset value, the control signal generator may include a control signal generator that outputs the light emission driving signal which sets the pulse width of the emission control signal to the first value.

In an embodiment, the control signal generator may output the light emission driving signal such that the pulse width of the emission control signal has the first value when the mode signal indicates a normal mode.

In an embodiment, the emission control signal may include an off-section in which the second transistor is turned off and an on-section in which the second transistor is turned on, and the off-section may correspond to the pulse width of the emission control signal.

In an embodiment, a frequency of the emission control signal may be higher than the first frequency.

In an embodiment, the blank period may include a first hold section and a second hold section, during the first hold section, the pulse width of the emission control signal may have the second value, and, during the second hold section, the pulse width of the emission control signal may have the first value.

In an embodiment, the first transistor may further include a first electrode connected to a first driving voltage line, a second electrode, and a gate electrode, and the second transistor may further include a first electrode connected to the second electrode of the first transistor and a second electrode connected to the light-emitting device.

In an embodiment of the invention, a method of driving a display device including a light-emitting device, a first transistor, and a second transistor connected between the first transistor and the light-emitting device and including a gate electrode for receiving an emission control signal, includes determining whether an operation mode is a variable frequency mode, determining whether a driving frequency is a second frequency lower than a first frequency, and a light emission driving operation of setting a pulse width of the emission control signal to a first value during an active period when the operation mode is the variable frequency mode and the driving frequency is the second frequency, and setting the pulse width of the emission control signal to a second value different from the first value during a blank period. When the driving frequency is the second frequency, one frame includes the active period and the blank period.

In an embodiment, the emission control signal may include an off-section in which the second transistor is turned off and an on-section in which the second transistor is turned on, and the off-section may correspond to the pulse width of the emission control signal.

In an embodiment, a frequency of the emission control signal may be higher than the first frequency.

In an embodiment, the blank period may include a first hold section and a second hold section, and the method may further include determining whether a current time is the first hold section, and the light emission driving operation may further include setting the pulse width of the emission control signal to the second value during the first hold section, and setting the pulse width of the emission control signal to the first value during the second hold section.

In an embodiment, the determining whether the current time is the first hold section may include counting in response to a clock signal and outputting a count value when the operation mode is the variable frequency mode, when the count value is a first count value, determining the current time as the first hold section, and a frequency of the clock signal is equal to a frequency of the emission control signal.

In an embodiment, the determining whether the driving frequency is the second frequency may include counting in response to a control signal and outputting a count value when the operation mode is the variable frequency mode, and determining the driving frequency as the second frequency when the count value is greater than a reference value.

BRIEF DESCRIPTION OF THE DRAWINGS

The above and other advantages and features of the invention will become apparent by describing in detail embodiments thereof with reference to the accompanying drawings.

DETAILED DESCRIPTION

Figure 1:
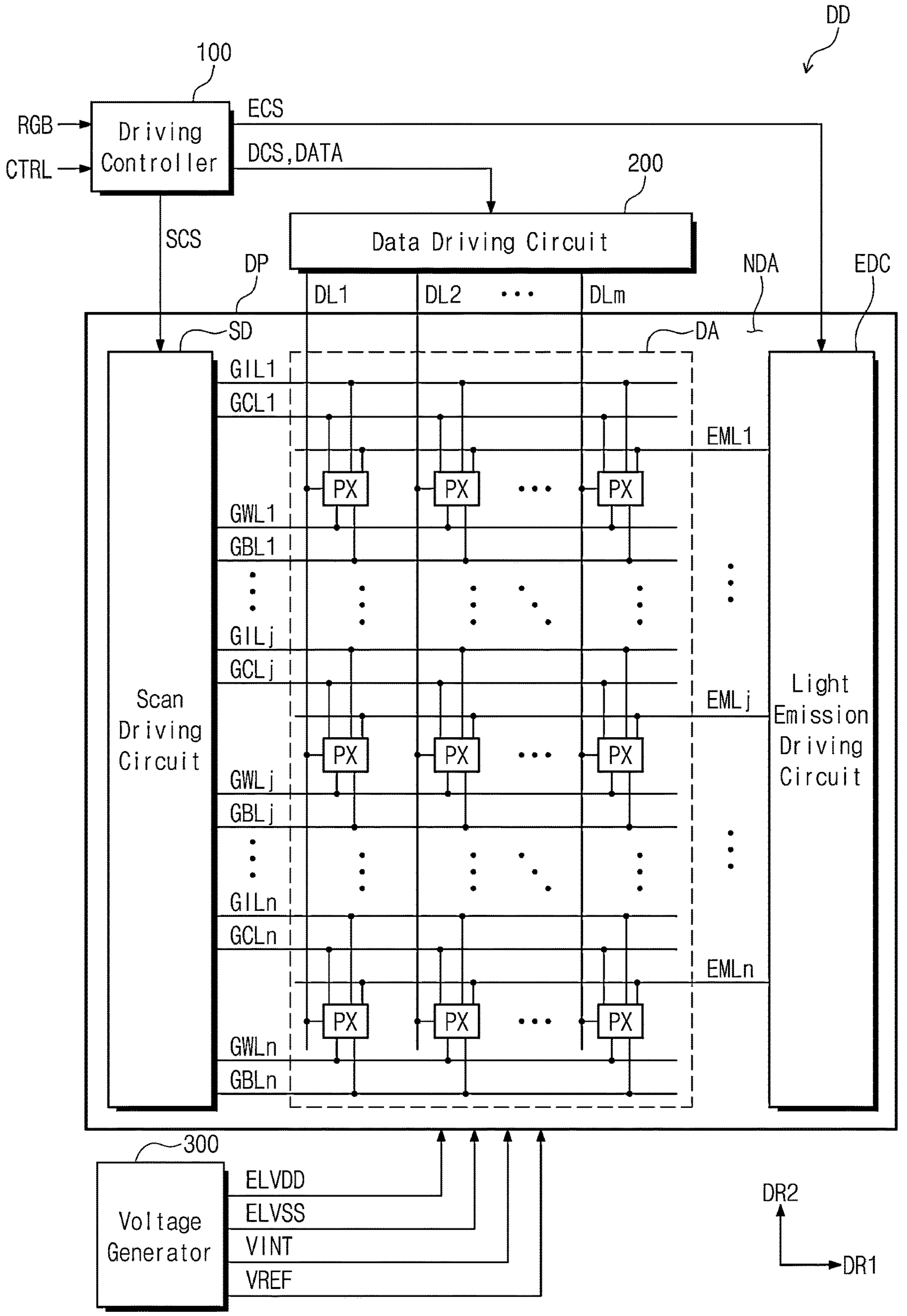
FIG. 1 is a block diagram illustrating an embodiment of a display device according to the invention.

In the specification, when one component (or area, layer, part, or the like) is also referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. A first component may be named as a second component, and vice versa, without departing from the spirit or scope of the invention, for example. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the invention.

Hereinafter, embodiments of the invention will be described with reference to accompanying drawings.

FIG. 1 is a block diagram illustrating an embodiment of a display device according to the invention.

Referring to FIG. 1, a display device DD includes a display panel DP, a driving controller 100, a data driving circuit 200, and a voltage generator 300.

The driving controller 100 receives an image signal (also referred to as an input image signal) RGB and a control signal CTRL. The driving controller 100 generates an output image signal DATA obtained by converting a data format of the input image signal RGB so as to be suitable for the interface specification of the data driving circuit 200. The driving controller 100 outputs a scan driving signal SCS, a data driving signal DCS, and an emission driving signal ECS.

The driving controller 100 in an embodiment of the invention determines a frequency of the input image signal RGB, and outputs the output image signal DATA corresponding to the previous input image signal during a blank period of the input image signal RGB, based on the input image signal RGB and the control signal CTRL. Accordingly, the output image signal DATA may be provided to the display panel DP even in the blank period of the input image signal RGB.

The data driving circuit 200 receives the data driving signal DCS and the output image signal DATA from the driving controller 100. The data driving circuit 200 converts the output image signal DATA into data signals and then outputs the data signals to a plurality of data lines DL1 to DLm to be described later. The data signals are analog voltages corresponding to grayscale values of the output image signal DATA.

The voltage generator 300 generates voltages desired for an operation of the display panel DP. In an embodiment, the voltage generator 300 generates a first driving voltage ELVDD, a second driving voltage ELVSS, a reference voltage VREF, and an initialization voltage VINT.

The display panel DP includes scan lines GIL1 to GILn, GCL1 to GCLn, GWL1 to GWLn, GBL1 to GBLn, emission control lines EML1 to EMLn, data lines DL1 to DLm, and pixels PX. Here, n and m are natural numbers. The display panel DP may further include a scan driving circuit SD and a light emission driving circuit EDC.

In an embodiment, the pixels PX may be arranged in a display area DA, and the scan driving circuit SD and the light emission driving circuit EDC may be arranged in a non-display area NDA.

In an embodiment, the scan driving circuit SD is arranged on a first side (e.g., a left side in FIG. 1) of the display panel DP. The scan lines GIL1 to GILn, GCL1 to GCLn, GWL1 to GWLn, and GBL1 to GBLn extend from the scan driving circuit SD in a first direction DR1.

The light emission driving circuit EDC is arranged on a second side (e.g., a right side in FIG. 1) of the display panel DP. The emission control lines EML1 to EMLn extend from the light emission driving circuit EDC in a direction opposite to the first direction DR1.

The scan lines GIL1 to GILn, GCL1 to GCLn, GWL1 to GWLn, and GBL1 to GBLn and the emission control lines EML1 to EMLn are arranged to be spaced apart from one another in a second direction DR2. The data lines DL1 to DLm extend from the data driving circuit 200 in a direction (e.g., a downward direction in FIG. 1) opposite to the second direction DR2, and are arranged spaced from one another in the first direction DR1.

In an embodiment illustrated in FIG. 1, the scan driving circuit SD and the light emission driving circuit EDC are arranged facing each other with the pixels PX interposed therebetween, but the invention is not limited thereto. In an embodiment, the scan driving circuit SD and the light emission driving circuit EDC may be disposed adjacent to each other on one of the first side and the second side of the display panel DP, for example. In an embodiment, the scan driving circuit SD and the light emission driving circuit EDC may be implemented with one circuit.

The display panel DP includes the scan lines GIL1 to GILn, GCL1 to GCLn, GWL1 to GWLn, GBL1 to GBLn, the emission control lines EML1 to EMLn, and the data lines DL1 to DLm. Each of the plurality of pixels PX may be electrically connected to four scan lines and one emission control line. In an embodiment, as illustrated in FIG. 1, pixels PX in a first row may be connected to the scan lines GILL GCL1, GWL1, and GBL1 and the emission control line EML1, for example. In addition, pixels in a j-th row may be connected to the scan lines GILj, GCLj, GWLj, and GBLj and the emission control line EMLj. Here, j is a natural number equal to or less than n.

Each of the plurality of pixels PX includes a light-emitting device ED (refer to FIG. 2) and a pixel circuit PXC (refer to FIG. 2) for controlling the light emission of the light-emitting device ED. The pixel circuit PXC may include one or more transistors and one or more capacitors. The scan driving circuit SD and the light emission driving circuit EDC may include transistors formed through the same process as the pixel circuit PXC.

Each of the plurality of pixels PX receives the first driving voltage ELVDD, the second driving voltage ELVSS, the reference voltage VREF, and the initialization voltage VINT from the voltage generator 300.

The scan driving circuit SD receives the scan driving signal SCS from the driving controller 100. The scan driving circuit SD may output scan signals to the scan lines GIL1 to GILn, GCL1 to GCLn, GWL1 to GWLn, and GBL1 to GBLn in response to the scan driving signal SCS. The circuit configuration and operation of the scan driving circuit SD will be described in detail later.

Figure 2:
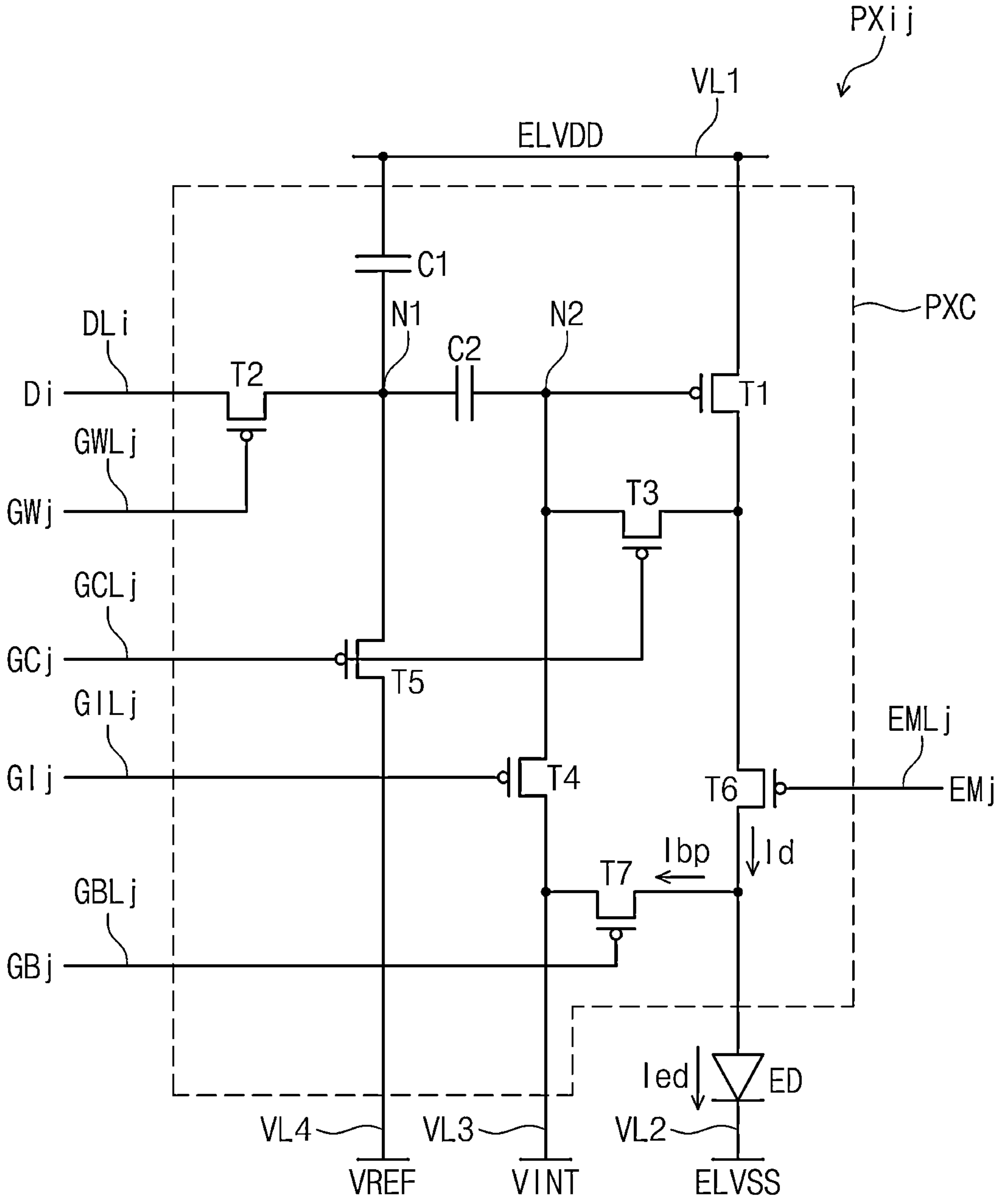
FIG. 2 is an equivalent circuit diagram of an embodiment of a pixel, according to the invention.

FIG. 2 is an equivalent circuit diagram of an embodiment of a pixel, according to the invention.

FIG. 2 illustrates an equivalent circuit diagram of an embodiment of a pixel PXij connected to the i-th data line DLi of the data lines DL1 to DLm, the j-th scan lines GILj, GCLj, GWLj, and GBLj of scan lines GIL1 to GILn, GCL1 to GCLn, GWL1 to GWLn, and GBL1 to GBLn, and the j-th emission control line EMLj of the emission control lines EML1 to EMLn, illustrated in FIG. 1. Here, j is a natural number equal to or less than m.

Each of the plurality of pixels PX illustrated in FIG. 1 may have the same circuit configuration as the equivalent circuit diagram of the pixel PXij illustrated in FIG. 2.

Referring to FIG. 2, the pixel PXij in an embodiment includes the pixel circuit PXC and at least one light-emitting device ED. The pixel circuit PXC includes first to seventh transistors T1, T2, T3, T4, T5, T6, and T7, a first capacitor C1, and a second capacitor C2. The light-emitting device ED may be a light-emitting diode. In an embodiment, it is described that the one pixel PXij includes one light-emitting device ED.

In an embodiment, each of the first to seventh transistors T1 to T7 is a P-type transistor having a low-temperature polycrystalline silicon ("LTPS") semiconductor layer. However, the invention is not limited thereto. In an embodiment, each of the first to seventh transistors T1 to T7 may be an N-type transistor using an oxide semiconductor as a semiconductor layer. In another embodiment, at least one of the first to seventh transistors T1 to T7 may be an N-type transistor, and the remaining transistors may be P-type transistors. In addition, the circuit configuration of the pixel according to the invention is not limited to FIG. 2. The pixel circuit PXC illustrated in FIG. 2 is only one of embodiments. In an embodiment, the configuration of the pixel circuit PXC may be modified and implemented, for example.

The scan lines GILj, GCLj, GWLj, and GBLj may transfer the scan signals GIj, GCj, GWj, and GBj, respectively, and the emission control line EMLj may transfer the emission control signal EMj. The data line DLi transfers a data signal Di. The data signal Di may have a voltage level corresponding to the image signal RGB input to the display device DD (refer to FIG. 1). First to fourth driving voltage lines VL1, VL2, VL3, and VL4 may transfer the first driving voltage ELVDD, the second driving voltage ELVSS, the initialization voltage VINT, and the reference voltage VREF, respectively.

The first capacitor C1 may connected between a first driving voltage line VL1 and a first node N1. The second capacitor C2 is connected between the first node N1 and the second node N2.

The first transistor T1 includes a first electrode connected to the first driving voltage line VL1, a second electrode electrically connected to an anode of the light-emitting device ED through the sixth transistor T6, and a gate electrode connected to the second node N2. The first transistor T1 may receive the data signal Di transferred by the data line DLi depending on the switching operation of the second transistor T2 to the gate electrode of the first transistor T1 through the second capacitor C2 and then may supply a driving current Id to the light-emitting device ED.

The second transistor T2 includes a first electrode connected to the data line DLi, a second electrode connected to the first node N1, and a gate electrode connected to the scan line GWLj. The second transistor T2 may be turned on depending on the scan signal GWj received through the scan line GWLj and then may transfer the data signal Di transferred from the data line DLi to the first node N1.

The third transistor T3 includes a first electrode connected to a second electrode of the first transistor T1, a second electrode connected to the second node, that is, the gate electrode of the first transistor T1, and a gate electrode connected to the scan line GCLj. The third transistor T3 may be turned on depending on the scan signal GCj received through the scan line GCLj, and thus, the gate electrode and the second electrode of the first transistor T1 may be connected, that is, the first transistor T1 may be diode-connected.

The fourth transistor T4 includes a first electrode connected to the second node N2, a second electrode connected to the third driving voltage line VL3 through which the initialization voltage VINT is supplied, and a gate electrode connected to the scan line GILj. The fourth transistor T4 may be turned on depending on the scan signal GIj received through the scan line GILj and then may perform an initialization operation of initializing a voltage of the gate electrode of the first transistor T1 by transferring the initialization voltage VINT to the gate electrode of the first transistor T1.

The fifth transistor T5 includes a first electrode connected to the first node N1, a second electrode connected to the fourth driving voltage line VL4 through which the reference voltage VREF is transferred, and a gate electrode connected to the scan line GCLj. The fifth transistor T5 may be turned on depending on the scan signal GCj received through the scan line GCLj, and may transfer the reference voltage VREF to the first node N1.

The sixth transistor T6 includes a first electrode connected to the second electrode of the first transistor T1, a second electrode connected to the anode of the light-emitting device ED, and a gate electrode connected to the emission control line EMLj.

The sixth transistor T6 may be turned on depending on the emission control signal EMj received through the emission control line EMLj. As the sixth transistor T6 is turned on, a current path may be formed between the first driving voltage line VL1 and the light-emitting device ED through the first transistor T1 and the sixth transistor T6.

The seventh transistor T7 includes a first electrode connected to the anode of the light-emitting device ED, a second electrode connected to the third driving voltage line VL3, and a gate electrode connected to the scan line GBLj. The seventh transistor T7 is turned on depending on the scan signal GBj received through the scan line GBLj, and bypasses a current of the anode of the light-emitting device ED to the third driving voltage line VL3.

The light-emitting device ED includes the anode connected to the second electrode of the sixth transistor T6 and a cathode connected to the second driving voltage line VL2.

Figure 3:
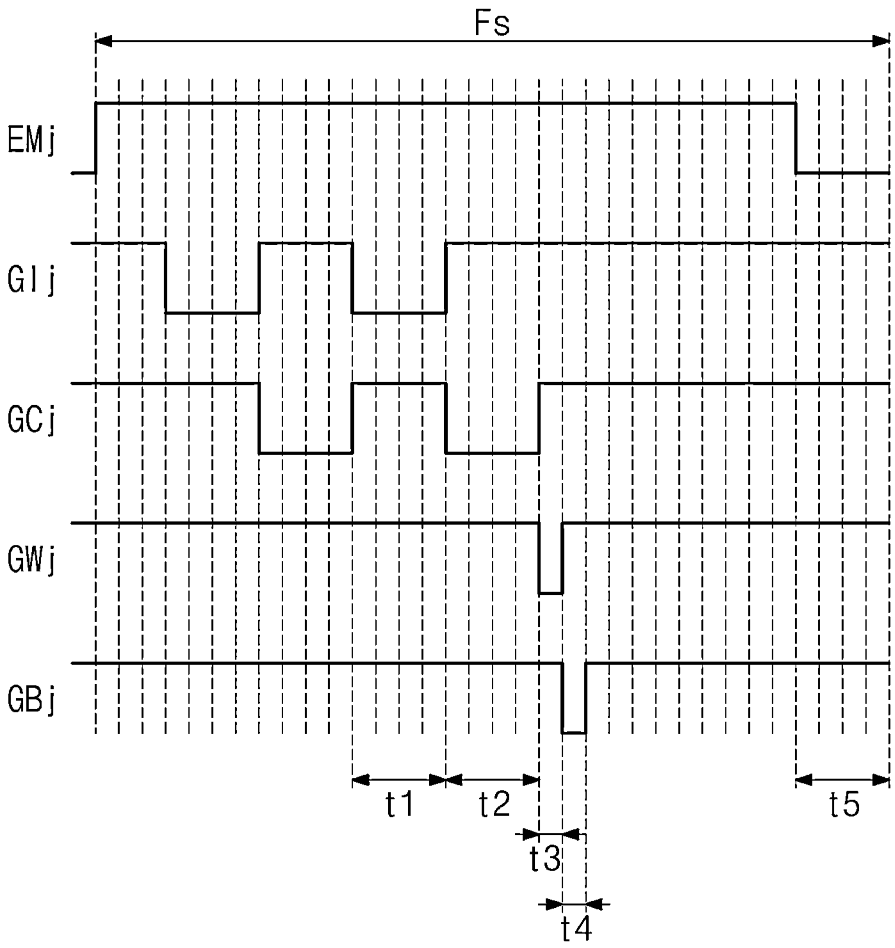
FIG. 3 is a timing diagram for describing an operation of a pixel illustrated in FIG. 2.

FIG. 3 is a timing diagram for describing an operation of a pixel illustrated in FIG. 2. Hereinafter, an operation of a display device in an embodiment will be described with reference to FIGS. 2 and 3.

Referring to FIGS. 2 and 3, the scan signal GIj having a low level is provided through the scan line GILj during an initialization section t1 within one frame Fs. When the fourth transistor T4 is turned on in response to the scan signal GIj having a low level, the initialization voltage VINT is supplied to the gate electrode of the first transistor T1 through the fourth transistor T4 so as to initialize the first transistor T1.

Next, when the scan signal GCj having a low level is supplied through the scan line GCLj during a compensation section t2, the third transistor T3 is turned on. The first transistor T1 is diode-connected by the turned-on third transistor T3 and is forward biased. Therefore, the potential of the second node N2 may be set as a difference (ELVDD-Vth) between the first driving voltage ELVDD and a threshold voltage (also referred to as Vth) of the first transistor T1.

Also, the fifth transistor T5 is turned on by the scan signal GCj of the low level. The reference voltage VREF is supplied to the first node N1 by the turned-on fifth transistor T5.

To minimize the influence of the data signal Di of the previous frame in the pixel PXij, the initialization section t1 and the compensation section t2 within one frame may be repeated two or more times.

The scan signal GWj having a low level is provided through the scan line GWLj during a programming section t3. The second transistor T2 is turned on in response to the scan signal GWj having a low level, and the data signal Di is transferred to the first node N1 through the second transistor T2. In this case, the potential of the second node N2 increases by the voltage level of the data signal Di. Accordingly, a compensation voltage, which is obtained by reducing the voltage of the data signal Di supplied from the data line DLi by the threshold voltage Vth of the first transistor T1, is applied to the gate electrode of the first transistor T1. That is, a gate voltage applied to the gate electrode of the first transistor T1 may be the compensation voltage.

During a bypass section t4, the seventh transistor T7 is turned on by receiving the scan signal GBj having a low level through the scan line GBLj. A part of the driving current Id by the seventh transistor T7 may be drained through the seventh transistor T7 as a bypass current Ibp.

When the light-emitting device ED emits light under the condition that a minimum current of the first transistor T1 flows as a driving current for the purpose of displaying a black image, the black image may not be normally displayed. Accordingly, the seventh transistor T7 in the pixel PXij in an embodiment of the invention may distribute a part of the minimum current of the first transistor T1 to a current path, which is different from a current path to the light-emitting device ED, as the bypass current Ibp. In this case, the minimum current of the first transistor T1 means a current flowing under the condition that a gate-source voltage of the first transistor T1 is less than the threshold voltage, that is, the first transistor T1 is turned off. As a minimum driving current (e.g., a current of 10 picoamperes (pA) or less) under the condition of turning off the first transistor T1 is transferred to the light-emitting device ED, an image of black luminance is expressed. When the minimum driving current for displaying a black image flows, the influence of a bypass transfer of the bypass current Ibp may be great, whereas when a large driving current for displaying an image such as a normal image or a white image flows, there may be almost no influence of the bypass current Ibp. Accordingly, when a driving current for displaying a black image flows, a light-emitting current Ted of the light-emitting device ED, which corresponds to a result of subtracting the bypass current Ibp drained through the seventh transistor T7 from the driving current Id, may have a minimum current amount to such an extent as to accurately express a black image. Accordingly, a contrast ratio may be improved by implementing an accurate black luminance image by the seventh transistor T7. In an embodiment, the bypass signal is the scan signal GBj having a low level, but is not necessarily limited thereto.

Next, the sixth transistor T6 is turned on by the emission control signal EMj having a low level during the light emission section t5. Accordingly, the driving current Id is generated depending on a voltage difference between the gate voltage of the gate electrode of the first transistor T1 and the first driving voltage ELVDD and is supplied to the light-emitting device ED through the sixth transistor T6, and the current Ted flows through the light-emitting device ED.

Figure 4A:
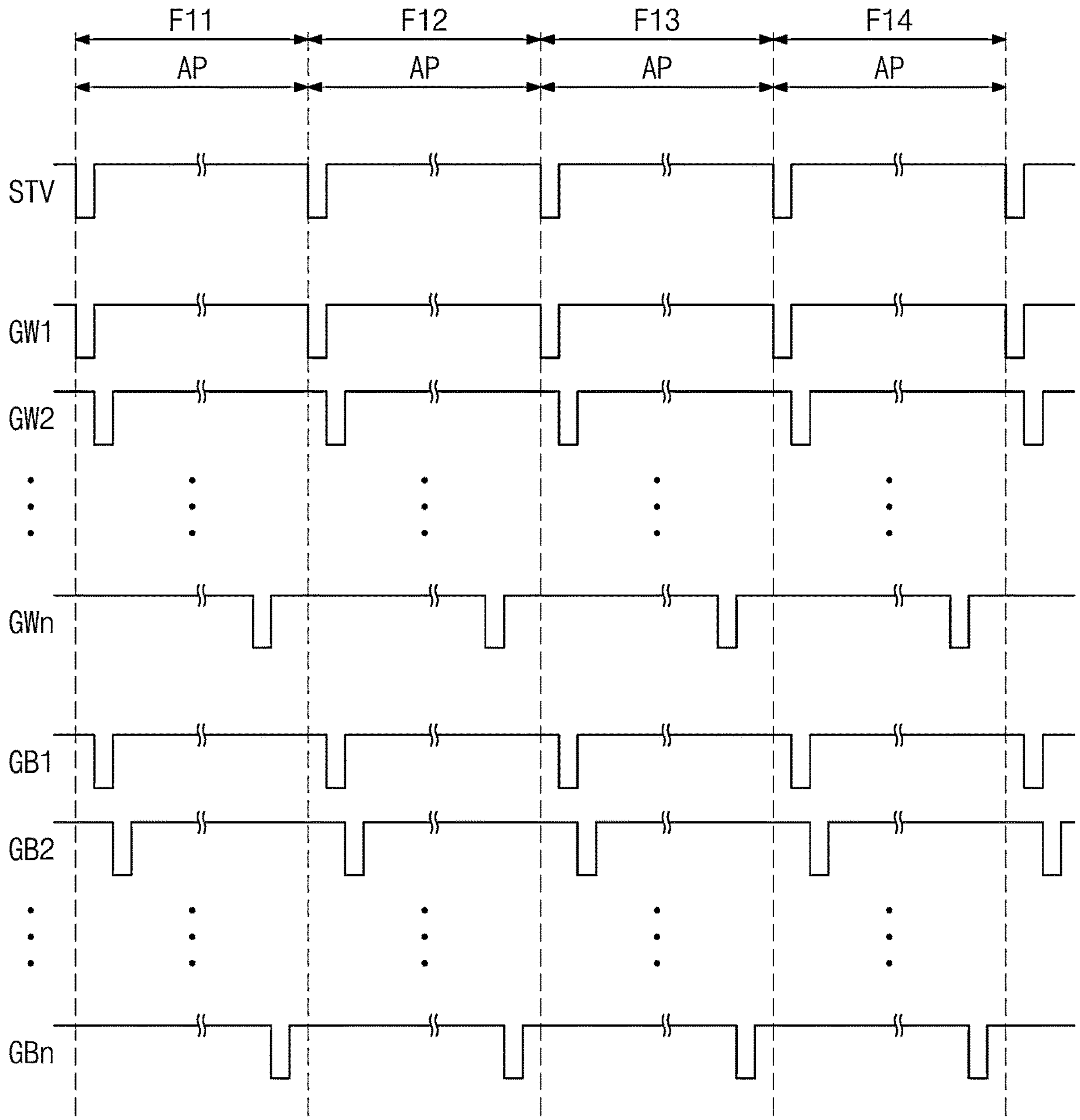
FIGS. 4A, 4B, and 4C are timing diagrams for describing an operation of a display device.
Figure 4B:
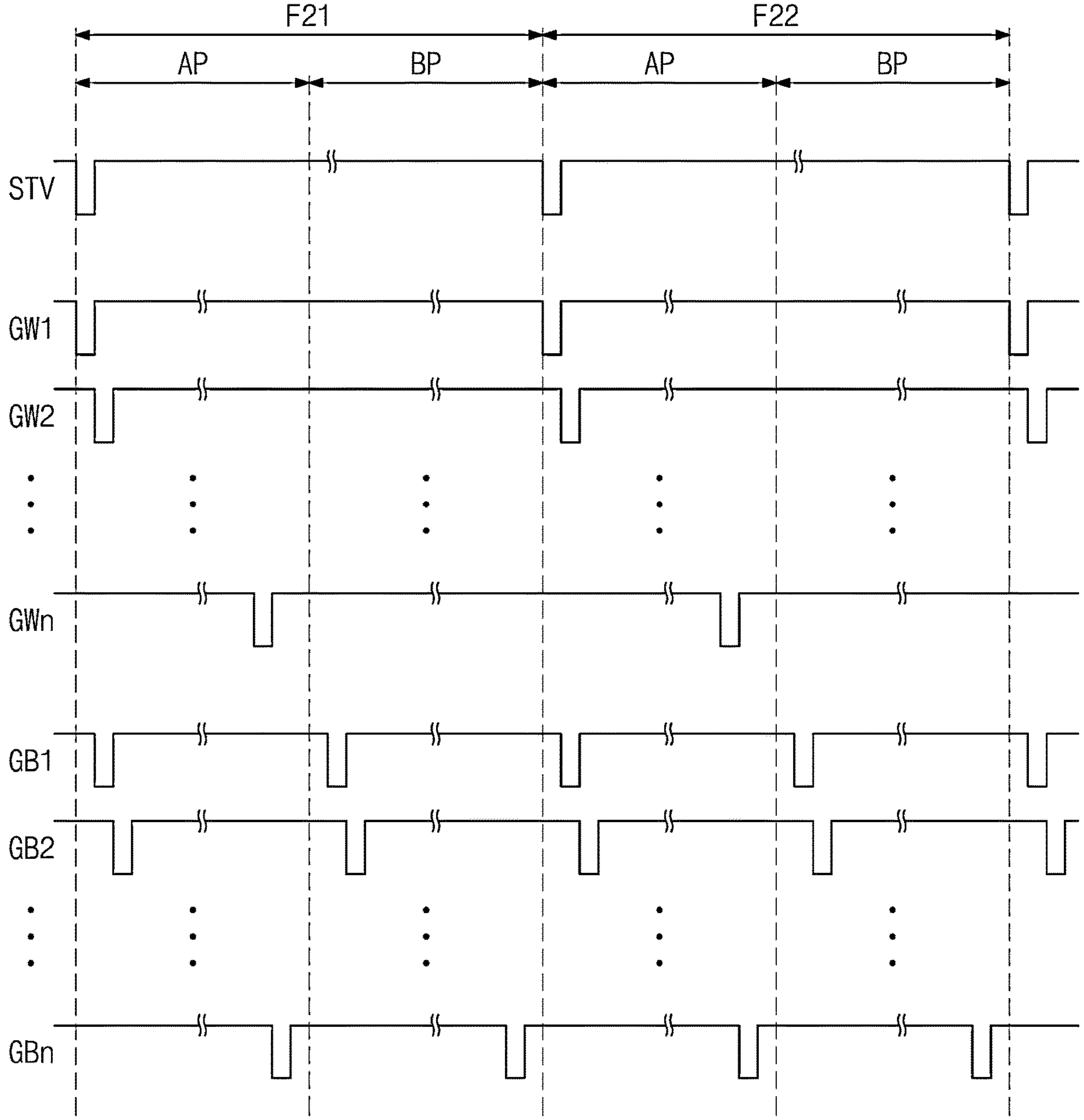
Figure 4C:
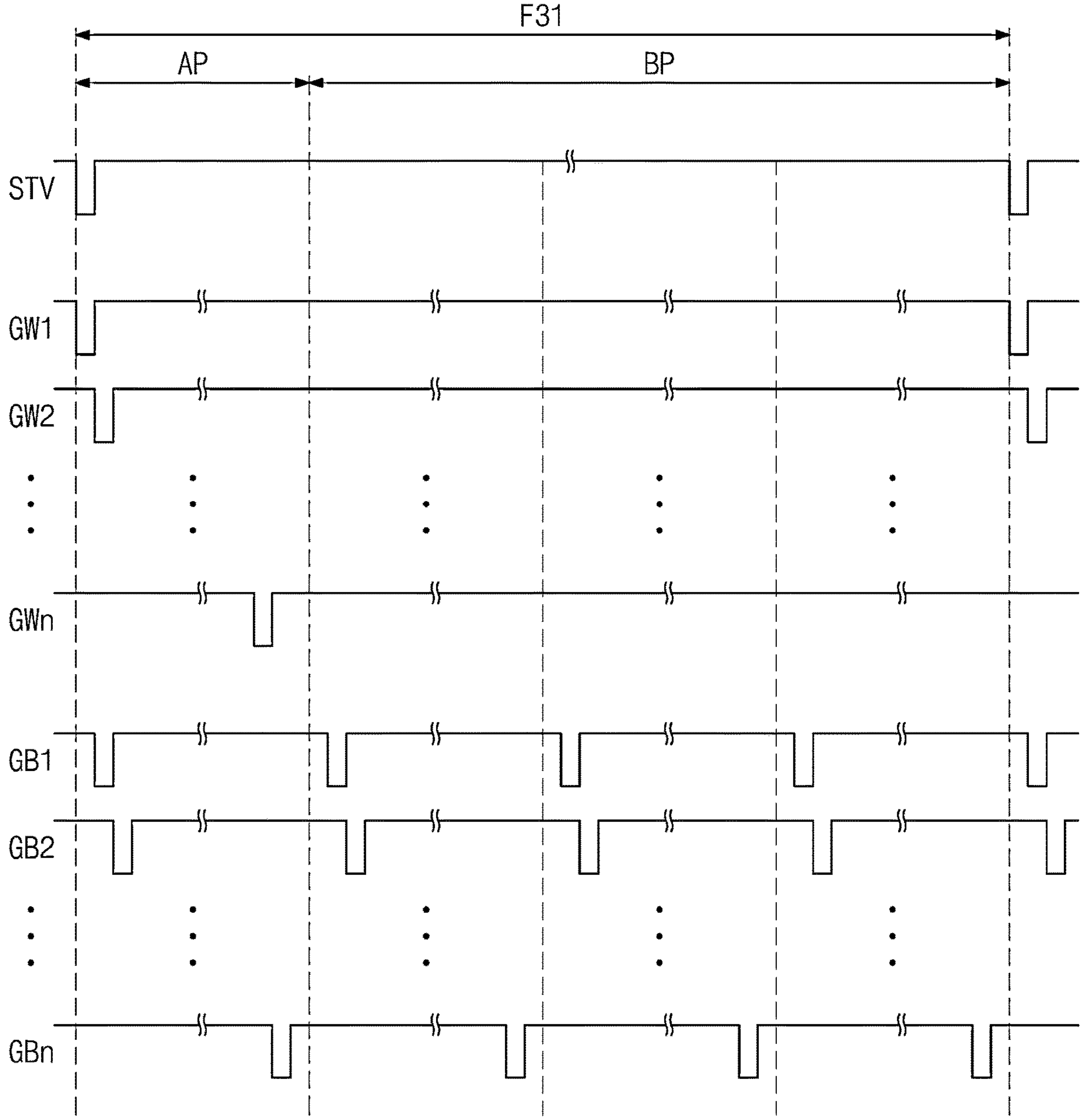

FIGS. 4A, 4B, and 4C are timing diagrams for describing an operation of a display device.

Referring to FIGS. 1, 2, 4A, 4B and 4C, for convenience of description, although the display device DD operates at a first frequency (e.g., 240 hertz (Hz)), a second frequency (e.g., 120 Hz), and a third frequency (e.g., 60 Hz) in an embodiment, the invention is not limited thereto. The driving frequency of the display device DD may be variously changed. In an embodiment, the driving frequency of the display device DD may be selected from among the first frequency, the second frequency, and the third frequency. In addition, the display device DD may change the driving frequency to any one of the first to third frequencies at any time without fixing the driving frequency to a predetermined frequency during operation. In an embodiment, the driving frequency of the display device DD may be determined depending on the frequency of the input image signal RGB. In an embodiment, the driving frequency of the display device DD may be set to a maximum frequency at which the display panel DP is operable regardless of the frequency of the input image signal RGB.

The driving controller 100 provides the scan driving signal SCS to the scan driving circuit SD. The scan driving signal SCS may include information on the driving frequency of the display device DD. The scan driving circuit SD may output scan signals GC1 to GCn, GI1 to GIn, GW1 to GWn, and GB1 to GBn in response to the scan driving signal SCS. The scan driving signal SCS may include a start signal STV. The start signal STV may be a signal indicating the start of one frame.

FIG. 4A is a timing diagram of a start signal and scan signals when the driving frequency of the display device DD is a first frequency (e.g., 240 Hz).

Referring to FIGS. 1 and 4A, when the driving frequency is the first operating frequency (e.g., 240 Hz), the scan driving circuit SD sequentially activates the scan signals GW1 to GWn to a low level, and sequentially activates the scan signals GB1 to GBn to a low level in each of frames F11, F12, F13, and F14. Although only the scan signals GW1 to GWn and the scan signals GB1 to GBn are illustrated in FIG. 4A, the scan signals GI1 to GIn and GC1 to GCn and the emission control signals EM1 to EMn may also be sequentially activated in each of the frames F11, F12, F13, and F14.

FIG. 4B is a timing diagram of a start signal and scan signals when a driving frequency of the display device DD is a second frequency (e.g., 120 Hz).

Referring to FIGS. 1 and 4B, when the driving frequency is the second frequency (e.g., 120 Hz), a period (or duration) of each of the frames F21 and F22 may be twice the period of each of the frames F11, F12, F13, and F14 illustrated in FIG. 4A. Each of the frames F21 and F22 may include the active period AP and the blank period BP. The scan driving circuit SD during the active period AP sequentially activates the scan signals GW1 to GWn to a low level and sequentially activates the scan signals GB1 to GBn to a low level. Although only the scan signals GW1 to GWn and the scan signals GB1 to GBn are illustrated in FIG. 4B, the scan signals GI1 to GIn and GC1 to GCn and the emission control signals EM1 to EMn may also be sequentially activated in the active period AP of each of the frames F21 and F22.

The scan driving circuit SD during the blank period BP may maintain the scan signals GW1 to GWn at an inactive level (e.g., a high level) and sequentially activates the scan signals GB1 to GBn.

Although not illustrated in FIG. 4B, the scan driving circuit SD may maintain the scan signals GI1 to GIn and GC1 to GCn at an inactive level (e.g., a high level) during the blank period BP. The light emission driving circuit EDC may sequentially activate the emission control signals EM1 to EMn during the blank period BP.

FIG. 4C is a timing diagram of a start signal and scan signals when a driving frequency of the display device DD is a third frequency (e.g., 60 Hz).

Referring to FIGS. 1 and 4C, when the driving frequency is a third frequency (e.g., 60 Hz), a period of a frame F31 may be twice the period of each of the frames F21 and F22 illustrated in FIG. 4B. The period of the frame F31 may be four times the period of each of the frames F11, F12, F13, and F14 illustrated in FIG. 4A.

The frame F31 may include the active period AP and the blank period BP. The scan driving circuit SD during the active period AP sequentially activates the scan signals GW1 to GWn to a low level and sequentially activates the scan signals GB1 to GBn to a low level. Although only the scan signals GW1 to GWn and the scan signals GB1 to GBn are illustrated in FIG. 4C, the scan signals GI1 to GIn and GC1 to GCn and the emission control signals EM1 to EMn may also be sequentially activated in the active period AP of the frame F31.

The scan driving circuit SD during the blank period BP may maintain the scan signals GW1 to GWn at an inactive level (e.g., a high level) and sequentially activates the scan signals GB1 to GBn.

Although not illustrated in FIG. 4C, the scan driving circuit SD may maintain the scan signals GI1 to GIn and GC1 to GCn at an inactive level (e.g., a high level) during the blank period BP. The light emission driving circuit EDC may sequentially activate the emission control signals EM1 to EMn during the blank period BP.

Figure 5:
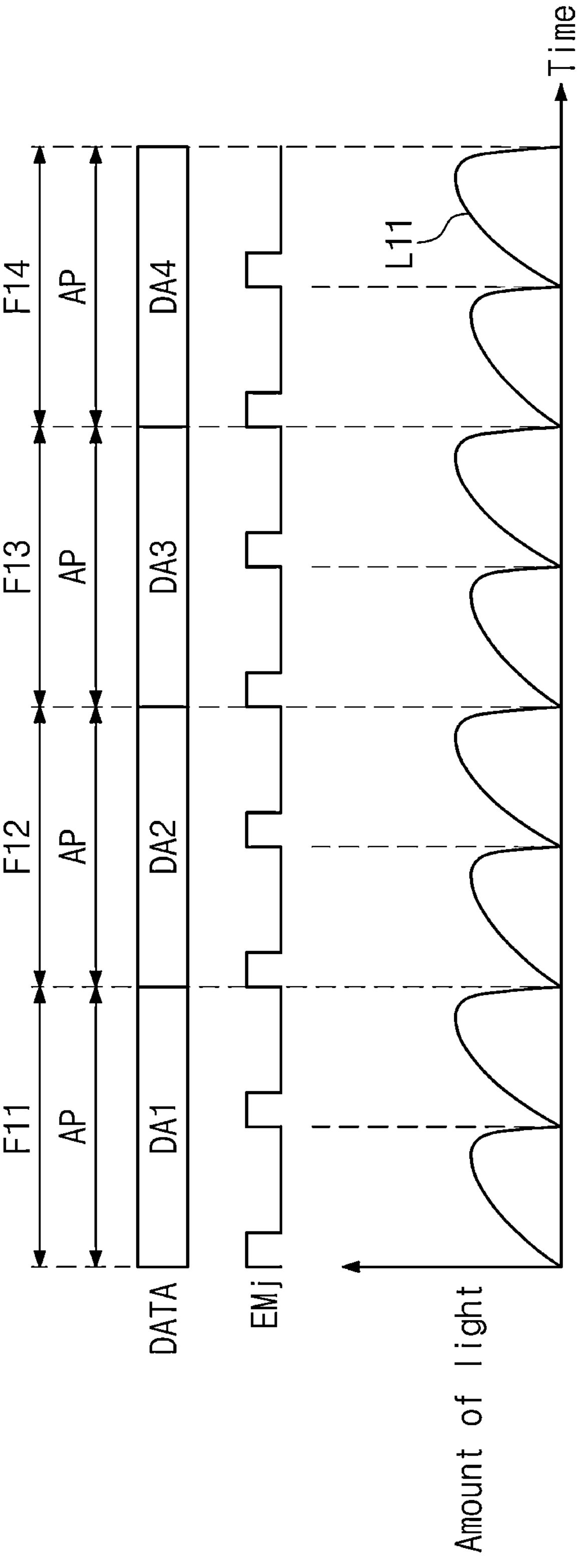
FIG. 5 is a diagram illustrating an output image signal and an emission control signal when a driving frequency of a display device is a first frequency.

FIG. 5 illustrates the output image signal DATA and the emission control signal EMj when a driving frequency of the display device DD is a first frequency (e.g., 240 Hz).

Referring to FIGS. 1 and 5, when the driving frequency is the first frequency (e.g., 240 Hz), the driving controller 100 sequentially outputs first to fourth output image signals DA1, DA2, DA3 and DA4, which are the output image signals DATA in the respective frames F11, F12, F13, and F14. The light emission driving circuit EDC activates the emission control signal EMj to a low level in each of the frames F11, F12, F13, and F14.

In an embodiment, the maximum operable frequency of the display device DD may be the first frequency (e.g., 240 Hz). In this case, the frequency of the emission control signal EMj may be 480 Hz, which is twice as high as the first frequency (e.g., 240 Hz). That is, in each of the frames F11, F12, F13, and F14, the emission control signal EMj may be activated at a low level twice. Although not illustrated in the drawing, the frequency of the scan signal GBj may also be 480 Hz, which is twice as high as the first frequency (e.g., 240 Hz), like the emission control signal EMj. The frequency of the emission control signal EMj is not limited to 480 Hz and may be variously changed to a frequency (e.g., 720 Hz) higher than the first frequency.

An amount of light curve L11 illustrated in FIG. 5 represents the amount of light of the light-emitting device ED illustrated in FIG. 2 when the driving frequency is the first frequency (e.g., 240 Hz). In this case, it is assumed that first to fourth output image signals DA1, DA2, DA3, and DA4, which are the output image signals DATA, correspond to the same grayscale level.

Figure 6:
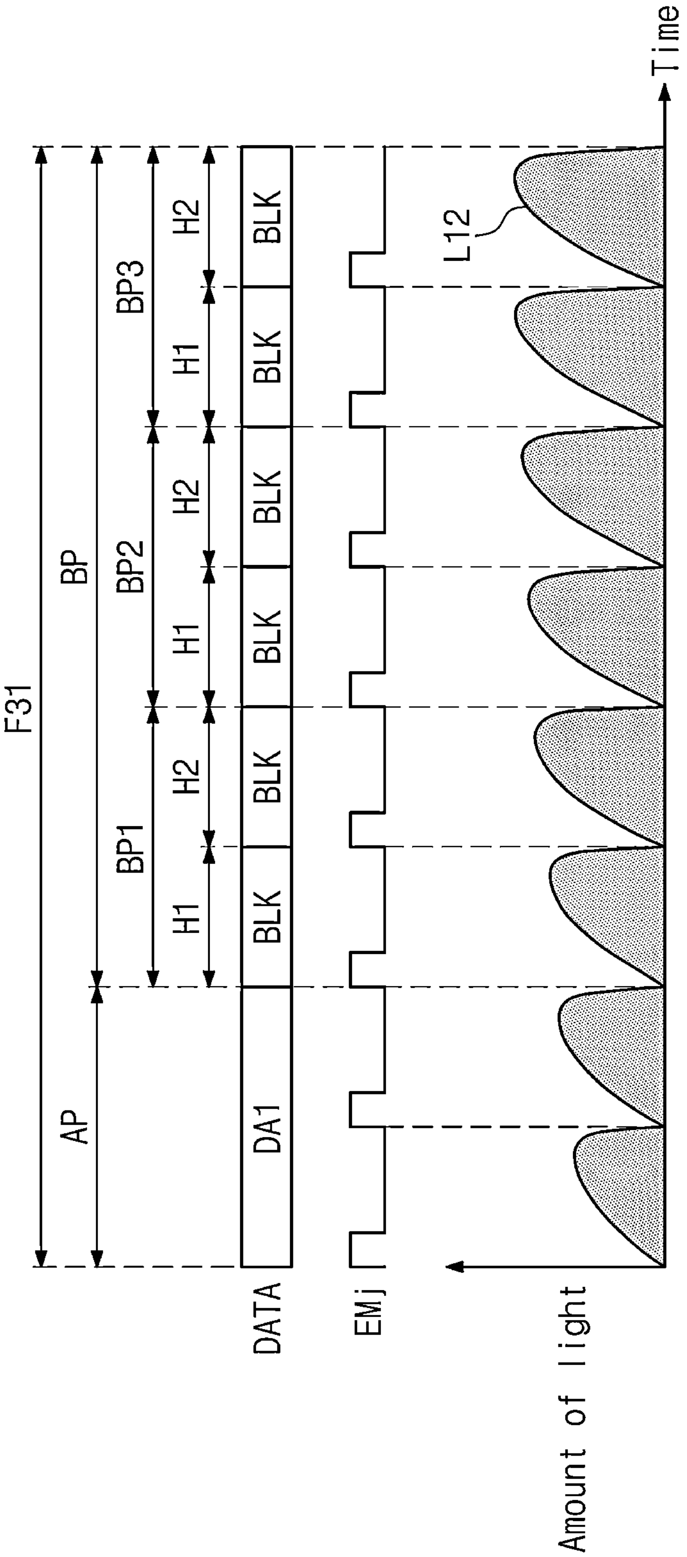
FIG. 6 is a diagram illustrating an output image signal and an emission control signal when a driving frequency of a display device is a first frequency.

FIG. 6 illustrates the output image signal DATA and the emission control signal EMj when a driving frequency of the display device DD is a third frequency (e.g., 60 Hz).

Referring to FIGS. 1 and 6, when the driving frequency is the third frequency (e.g., 60 Hz) lower than the first driving frequency (e.g., 240 Hz), the driving controller 100 outputs the first output image signal DA1, which is the output image signal DATA, in the active period AP of the frame F31. The driving controller 100 does not output the valid output image signal DATA during the blank period. In FIG. 6, the blank period BLK of the output image signal DATA is illustrated.

The light emission driving circuit EDC activates the emission control signal EMj at a low level in the blank period BP as well as in the active period AP of the frame F31. The blank period BP includes first, second, and third blank periods BP1, BP2, and BP3. The period of each of the first, second, and third blank periods BP1, BP2, and BP3 is the same as the period of the active period AP. Each of the first, second, and third blank periods BP1, BP2, and BP3 includes a first hold section H1 and a second hold section H2.

The frequency of the emission control signal EMj may be 480 Hz, which is twice as high as the first frequency (e.g., 240 Hz). That is, the emission control signal EMj may be activated at a low level twice in the active period AP, and may be activated at a low level once in each of the first hold section H1 and the second hold section H2 of each of the first, second, and third blank periods BP1, BP2, and BP3.

An amount of light curve L12 illustrated in FIG. 6 represents the amount of light of the light-emitting device ED illustrated in FIG. 2 when the driving frequency is the first frequency (e.g., 60 Hz). In this case, it is assumed that the first output image signal DA1, which is the output image signal DATA of the frame F31, corresponds to the same gray level as that of the first to fourth output image signals DA1, DA2, DA3, and DA4, which are the output image signals DATA of the frames F11, F12, F13, and F14 illustrated in FIG. 5.

Figure 7:
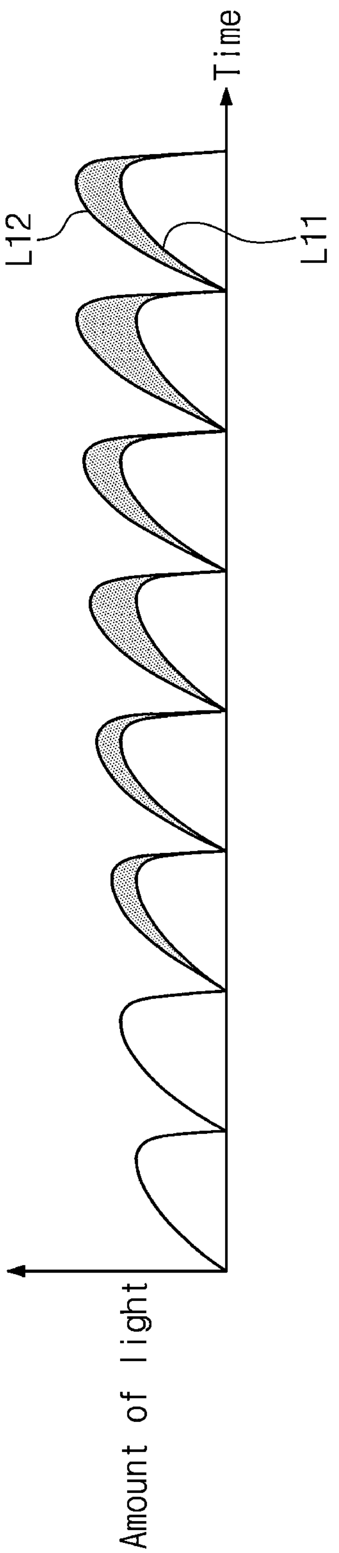
FIG. 7 is a diagram illustrating a comparison between an amount of light curve illustrated in FIG. 5 and an amount of light curve illustrated in FIG. 6.

FIG. 7 is a diagram illustrating a comparison between the amount of light curve L11 illustrated in FIG. 5 and the amount of light curve L12 illustrated in FIG. 6.

Referring to FIG. 7, when the amount of light curve L11 illustrated in FIG. 5 and the amount of light curve L12 illustrated in FIG. 6 are superimposed on a plane, it may be seen that there is a deviation between the amount of light curve L11 and the amount of light curve L12.

That is, when the driving frequency of the display device DD is the first frequency (e.g., 240 Hz), the amount of light of the light-emitting device ED (refer to FIG. 2) is different from the amount of light of the light-emitting device ED when the driving frequency of the display device DD is the third frequency (e.g., 60 Hz). In particular, it may be seen that the deviation in the amount of light of the light-emitting device ED increases in a section corresponding to the blank period BP of the frame F31 illustrated in FIG. 6. Such the deviation in the amount of light may be perceived by the user as flicker.

Figure 8:
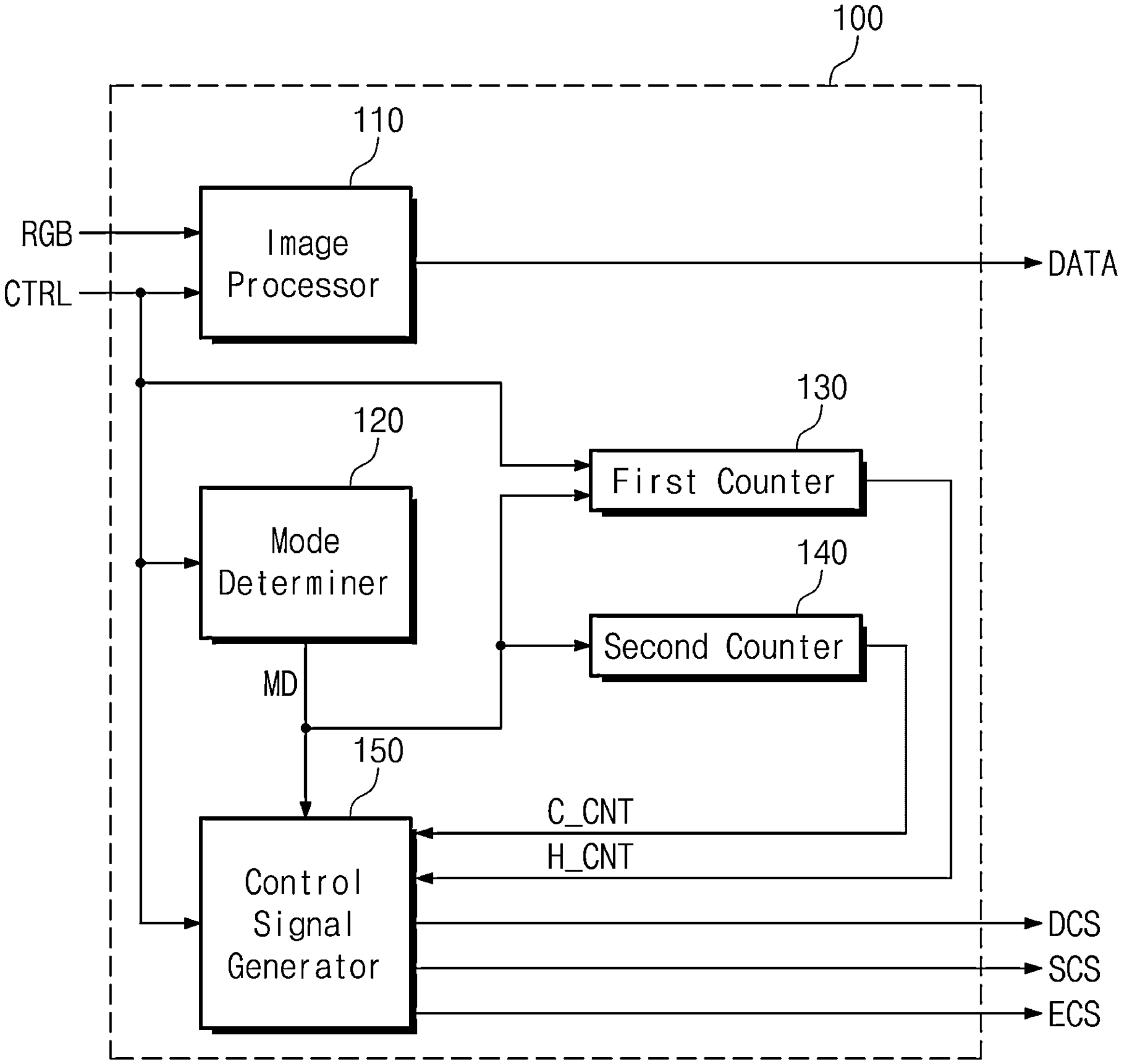
FIG. 8 is a block diagram illustrating a configuration of a driving controller of FIG. 2.

FIG. 8 is a block diagram illustrating a configuration of a driving controller.

Referring to FIGS. 1 and 8, the driving controller 100 includes an image processor 110, a mode determiner 120, a first counter 130, a second counter 140, and a control signal generator 150.

The image processor 110 receives the image signal RGB and the control signal CTRL. The image processor 110 outputs the output image signal DATA obtained by converting the data format of the input image signal RGB.

The mode determiner 120 determines an operation mode of the display device DD based on the control signal CTRL. Information on the operation mode of the display device DD may be included in the control signal CTRL provided from a host (not illustrated) such as a graphic processor, a main processor, an application processor, etc. The operation mode of the display device DD includes a normal mode, which is a constant frequency mode, and a variable frequency mode.

The driving frequency of the display device DD during the normal mode may be any one preset among the first to third frequencies (e.g., 240 Hz, 120 Hz, and 60 Hz). During the normal mode, the driving frequency of the display device DD may be the same for every frame. During the variable frequency mode, the driving frequency of the display device DD may be changed every frame.

The mode determiner 120 outputs a mode signal MD corresponding to the determined operation mode.

The first counter 130 may be reset in synchronization with the control signal CTRL when the mode signal MD indicates the variable frequency mode and may perform a count in synchronization with a horizontal synchronization signal (not illustrated). In an embodiment, the first counter 130 may perform the count in synchronization with a predetermined clock signal (not illustrated). The first counter 130 outputs a first count signal H_CNT.

The second counter 140 performs the count when the mode signal MD indicates the variable frequency mode, and outputs a second count signal C_CNT.

The control signal generator 150 receives the control signal CTRL, the mode signal MD, the first count signal H_CNT, and the second count signal C_CNT. The control signal generator 150 outputs the scan driving signal SCS, the data driving signal DCS, and the emission driving signal (also referred to as a light emission driving signal) ECS based on the control signal CTRL.

In an embodiment, the control signal generator 150 may output the emission driving signal ECS based on the control signal CTRL when the mode signal MD indicates the normal mode.

In an embodiment, when the mode signal MD indicates a variable frequency mode, the control signal generator 150 may output the emission driving signal ECS based on the control signal CTRL, the first count signal H_CNT, and the second count signal C_CNT.

Figure 9:
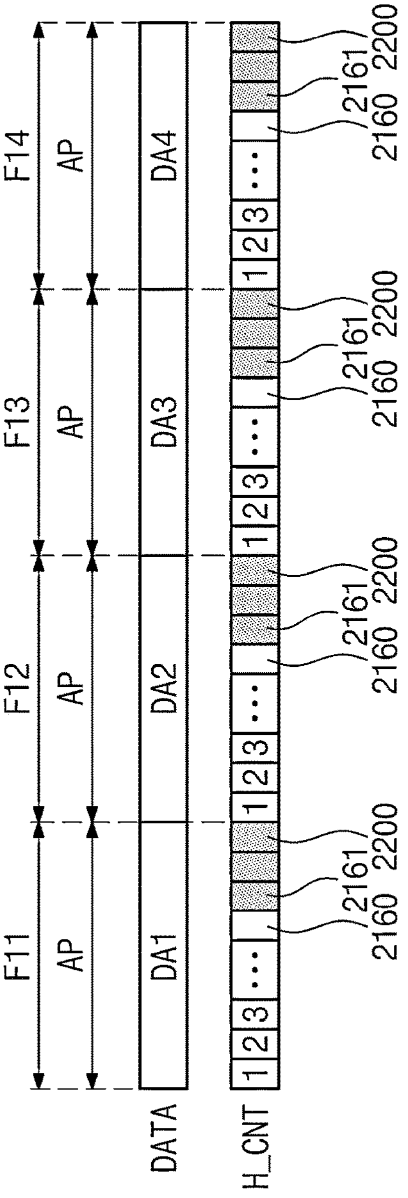
FIG. 9 is a diagram illustrating an output image signal and a first count signal when a driving frequency of a display device is a first frequency (e.g., 240 Hz) in a variable frequency mode.

FIG. 9 illustrates the output image signal DATA and the first count signal H_CNT when a driving frequency of the display device DD is a first frequency (e.g., 240 Hz) in a variable frequency mode.

Referring to FIGS. 8 and 9, the mode determiner 120 determines an operation mode based on the control signal CTRL and outputs the mode signal MD corresponding to the operation mode.

While the mode signal MD indicates the variable frequency mode, the first counter 130 may be reset in synchronization with a vertical synchronization signal (not illustrated) within the control signal CTRL and may perform a count in synchronization with a horizontal synchronization signal (not illustrated).

When the driving time of the pixels PX arranged in the first direction DR1 of the display panel DP (refer to FIG. 1) is 1H, the horizontal synchronization signal may be a signal that transitions to an active level every 1H. The vertical sync signal may be a signal that transitions to the active level at the beginning of every frame. In an embodiment, when the number (i.e., resolution) of the pixels PX arranged on the display panel DP is 3840×2160, the driving time for all the pixels PX for one frame may be 2160H, and a vertical blank interval may be 40H. In this case, the count value of the first counter 130 may increase up to 2160+40, that is, 2200 during one frame, for example. Therefore, in each of the frames F11, F12, F13, and F14, the count value of the first counter 130 may increase up to 2200.

When the mode signal MD indicates the variable frequency mode and the first count signal H_CNT is less than or equal to 2200, the control signal generator 150 outputs the emission driving signal ECS such that the pulse width of the inactive level of the emission control signals EM1 to EMn has a preset first value.

Figure 10:
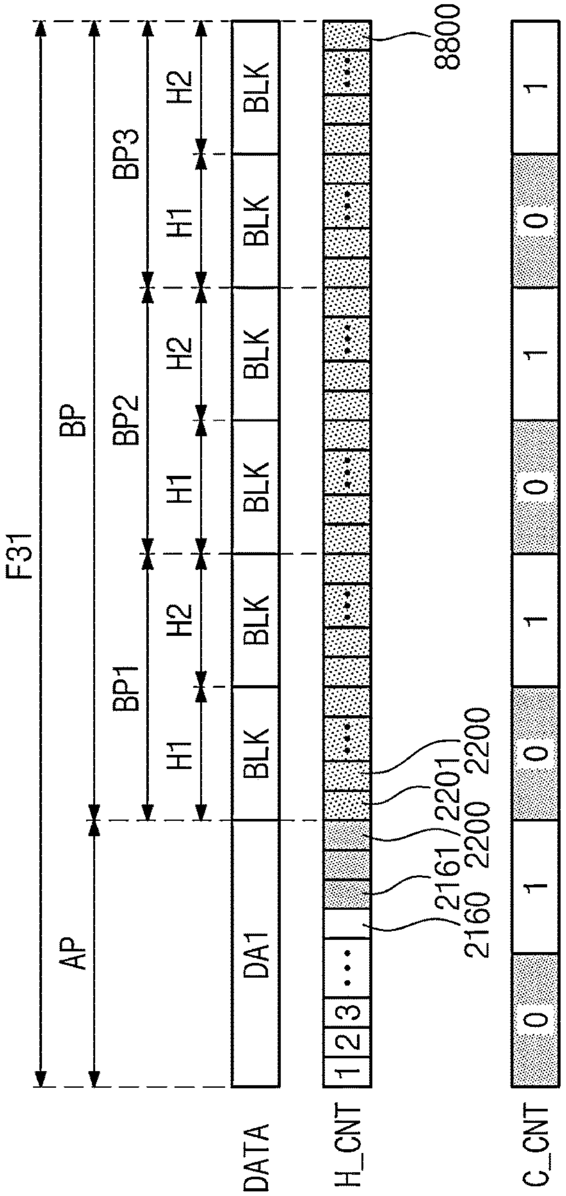
FIG. 10 is a diagram illustrating an output image signal, a first count signal, and a second count signal when a driving frequency of a display device is a third frequency in a variable frequency mode.

FIG. 10 illustrates the output image signal DATA, the first count signal H_CNT, and the second count signal C_CNT when a driving frequency of the display device DD is a third frequency (e.g., 60 Hz) in a variable frequency mode.

Figure 11:
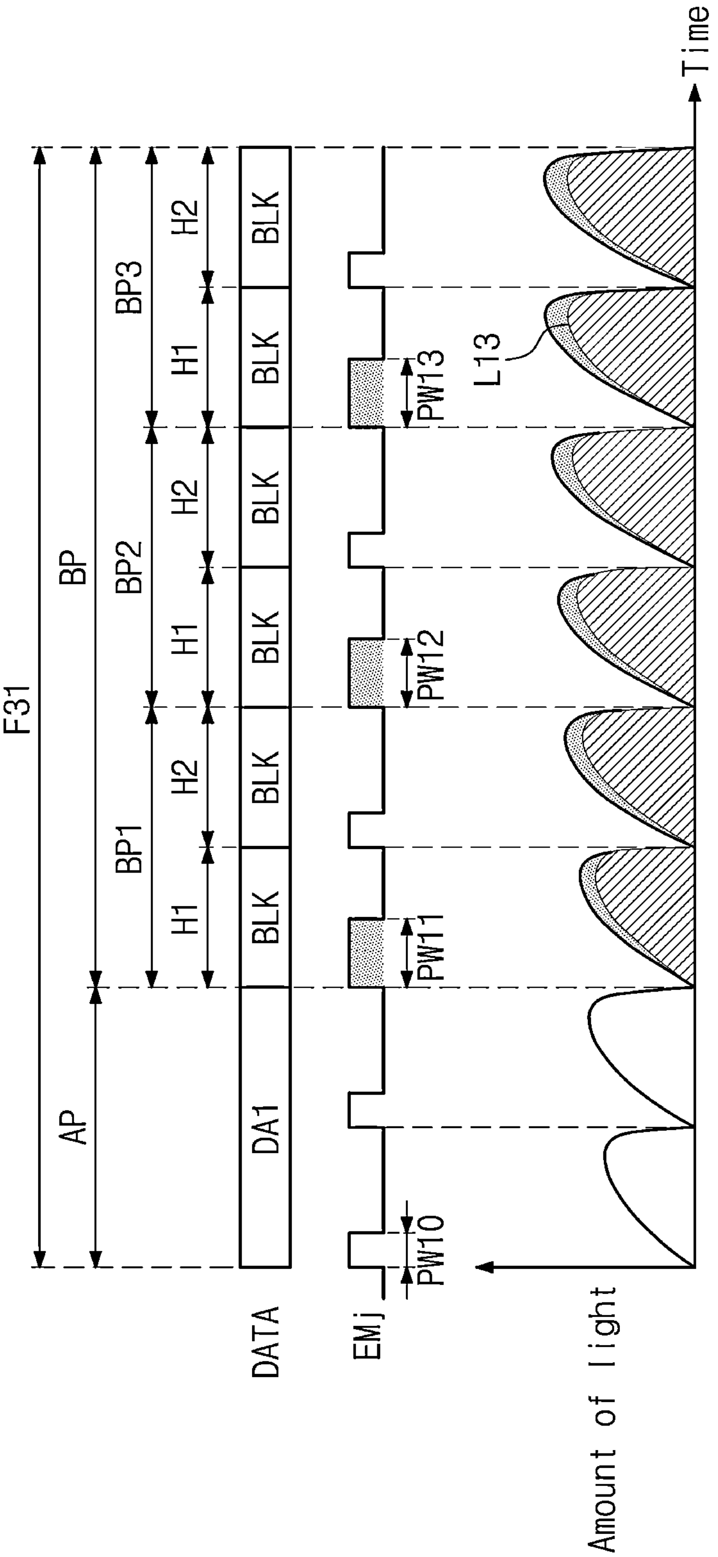
FIG. 11 is a diagram illustrating an output image signal and an emission control signal when a driving frequency of a display device is a first frequency.

FIG. 11 illustrates the output image signal DATA and the emission control signal EMj when a driving frequency of the display device DD is a third frequency (e.g., 60 Hz).

Referring to FIGS. 8, 10, and 11, the mode determiner 120 determines an operation mode based on the control signal CTRL and outputs the mode signal MD corresponding to the operation mode.

While the mode signal MD indicates the variable frequency mode, the first counter 130 may be reset in synchronization with a vertical synchronization signal (not illustrated) within the control signal CTRL and may perform a count in synchronization with a horizontal synchronization signal (not illustrated).

In an embodiment, when the number (i.e., resolution) of the pixels PX arranged on the display panel DP is 3840×2160, the driving time for all the pixels PX during the active period AP of the frame F31 may be 2160H, and a vertical blank interval may be 40H, for example. In this case, during the active period AP of the frame F31, the count value of the first counter 130 may increase up to 2160+40, that is, 2200. In the blank period BP, the vertical synchronization signal in the control signal CTRL is maintained at an inactive level. Therefore, in the blank period BP, the first counter 130 is not reset and continuously increases a count value in synchronization with the horizontal synchronization signal. Therefore, in the blank period BP of the frame F31, the count value of the first count signal H_CNT output from the first counter 130 may increase up to 8800.

The second counter 140 performs the count and outputs the second count signal C_CNT in synchronization with a clock signal having a frequency (e.g., 480 Hz) twice the first frequency (e.g., 240 Hz) while the mode signal MD indicates the variable frequency mode. In an embodiment, when the second counter 140 is a 1-bit counter, the count value of the second count signal C_CNT output from the second counter 140 may be '0' or '1'.

When the mode signal MD indicates the variable frequency mode, the count value of the first count signal H_CNT is greater than 2200, and a count value of the second count signal C_CNT is '0', the control signal generator 150 outputs the emission driving signal ECS such that the pulse width of the emission control signals EM1 to EMn has a second value different from the preset first value. In an embodiment, the second value may be greater than the preset first value.

As illustrated in FIG. 11, the emission control signal EMj includes an off-section and an on-section. The off-section of the emission control signal EMj may be a section in which the sixth transistor T6 illustrated in FIG. 2 is turned off, and the on-section may be a section in which the sixth transistor T6 is turned on.

The pulse width of the emission control signal EMj corresponds to the off-section. In the active period AP, the pulse width of the emission control signal EMj has a first value PW10. In the first hold sections H1 of the blank period BP of the frame F31, the pulse width of the emission control signal EMj has second values PW11, PW12, and PW13 greater than the first value PW10, respectively. In an embodiment, each of the second values PW11, PW12, and PW13 may be the same with one another. In an embodiment, the second values PW11, PW12, and PW13 are different from one another and may have a relationship of PW11<PW12<PW13.

An amount of light curve L13 illustrated in FIG. 11 represents the amount of light of the light-emitting device ED illustrated in FIG. 2 when the driving frequency is the first frequency (e.g., 60 Hz). In this case, it is assumed that first output image signal DA1, which is the output image signal DATA of the frame F31, corresponds to the same gray level as first to fourth output image signals DA1, DA2, DA3 and DA4, which are the output image signals DATA of the frames F11, F12, F13, and F14 illustrated in FIG. 5.

Figure 12:
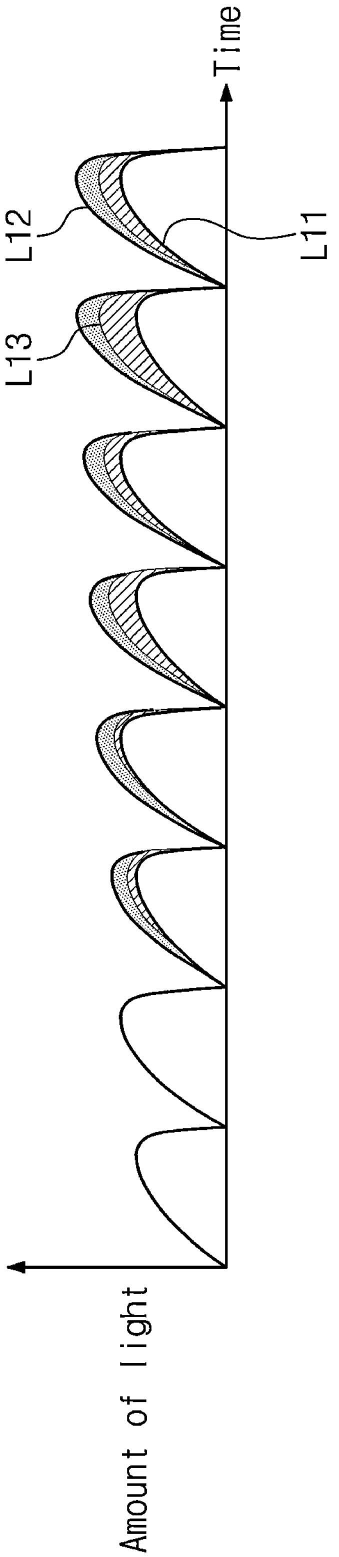
FIG. 12 is a diagram illustrating a comparison among an amount of light curve illustrated in FIG. 5, an amount of light curve illustrated in FIG. 6, and an amount of light curve illustrated in FIG. 11.

FIG. 12 is a diagram illustrating a comparison among the amount of light curve L11 illustrated in FIG. 5, the amount of light curve L12 illustrated in FIG. 6, and the amount of light curve L13 illustrated in FIG. 11.

Referring to the amount of light curves L11 and L12 illustrated in FIGS. 11 and 12, it may be seen that the amount of light further increases in the second blank period BP2 than in the first blank period BP1, and the amount of light of the light-emitting device ED (refer to FIG. 2) further increases in the third blank period BP3 than in the second blank period BP2.

That is, as the elapsed time of the blank period BP increases, the amount of light of the light-emitting device ED increases. This is due to the hysteresis characteristic of the first transistor T1 or the like.

As the pulse width of the emission control signal EMj is changed to second values PW11, PW12, and PW13 greater than the first value PW10 in the first hold sections H1 of the blank period BP, the turn-off time (i.e., the off-section) of the sixth transistor T6 increases, and the turn-on time (i.e., the on-section) decreases. When the turn-on time of the sixth transistor T6 is reduced, the amount of light of the light-emitting device ED may decrease.

As illustrated in FIG. 12, when the amount of light curves L11, L12, and L13 are superimposed on a plane, the amount of light curve L13 is located between the amount of light curve L11 and the amount of light curve L12.

By setting the pulse width of the emission control signal EMj to the second values PW11, PW12, and PW13 greater than the first value PW10 in the first hold sections H1 of the blank period BP, it may be seen that the deviation between the amount of light of the light-emitting device ED (refer to FIG. 2) when the driving frequency of the display device DD is the first frequency (e.g., 240 Hz) and the amount of light of the light-emitting device ED when the driving frequency is the third frequency (e.g., 60 Hz) is reduced.

Figure 13:
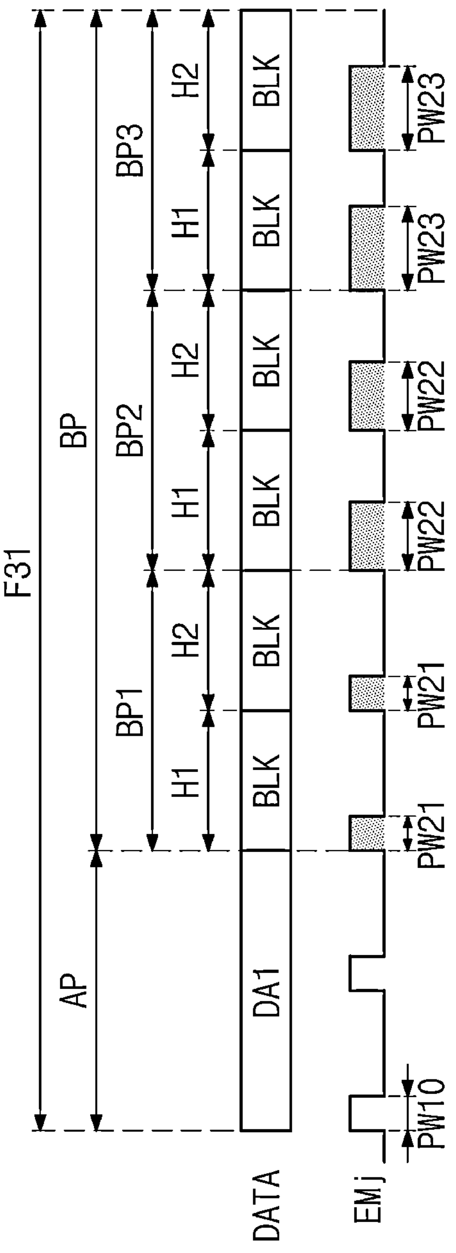
FIG. 13 is a diagram illustrating an output image signal and an emission control signal when a driving frequency of a display device is a first frequency.

FIG. 13 illustrates the output image signal DATA and the emission control signal EMj when a driving frequency of the display device DD is a third frequency (e.g., 60 Hz).

Referring to FIG. 13, in the active period AP of the frame F31, the pulse width of the emission control signal EMj has the first value PW10. In each of the first hold sections H1 and the second hold sections H2 in the blank period BP of the frame F31, the pulse width of the emission control signal EMj may have the second value greater than the first value PW10.

In an embodiment, in each of the first hold section H1 and the second hold section H2 in the first blank period BP1 of the blank period BP, the pulse width of the emission control signal EMj may have the second value PW21. In an embodiment, in each of the first hold section H1 and the second hold section H2 in the first blank period BP2 of the blank period BP, the pulse width of the emission control signal EMj may have the second value PW22. In an embodiment, in each of the first hold section H1 and the second hold section H2 in the first blank period BP3 of the blank period BP, the pulse width of the emission control signal EMj may have the second value PW23.

As the count value of the first count signal H_CNT increases, the control signal generator 150 illustrated in FIG. 8 outputs the emission control signal ECS such that the pulse width of the emission control signal EMj increases in the blank period BP. In particular, when the count value of the second count signal C_CNT is '0', the control signal generator 150 increases the pulse width of the emission control signal EMj, and maintains the pulse width of the emission control signal EMj when the count value of the second count signal C_CNT is '1'.

Under this control of the control signal generator 150, the first value PW10 and the second values PW21, PW22, and PW23, which are the pulse width of the emission control signal EMj output from the light emission driving circuit EDC may have a relationship of PW10<PW21<PW22<PW23.

Figure 14:
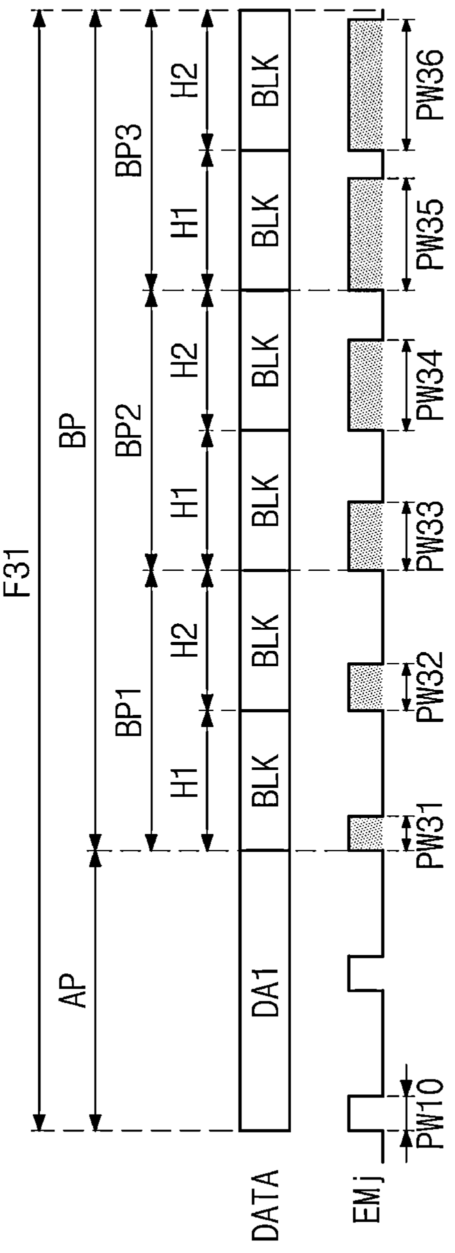
FIG. 14 is a diagram illustrating an output image signal and an emission control signal when a driving frequency of a display device is a first frequency.

FIG. 14 illustrates the output image signal DATA and the emission control signal EMj when a driving frequency of the display device DD is a third frequency (e.g., 60 Hz).

Referring to FIG. 14, in the active period AP of the frame F31, the pulse width of the emission control signal EMj has the first value PW10. In each of the first hold sections H1 and the second hold sections H2 in the blank period BP of the frame F31, the pulse width of the emission control signal EMj may have the second value greater than the first value PW10.

In an embodiment, in the first hold section H1 and the second hold section H2 in the first blank period BP1 of the blank period BP, the pulse widths of the emission control signal EMj may respectively have the second and third values PW31 and PW32. In an embodiment, in the first hold section H1 and the second hold section H2 in the first blank period BP2 of the blank period BP, the pulse widths of the emission control signal EMj may respectively have the second and third values PW33 and PW34. In an embodiment, in the first hold section H1 and the second hold section H2 in the first blank period BP3 of the blank period BP, the pulse widths of the emission control signal EMj may respectively have the second and third values PW35 and PW36. In an embodiment, the first value PW10 and the second values PW31 to PW36 of the pulse width may have a relationship of PW10<PW31<PW32<PW33<PW34<PW35<PW36.

As the count value of the first count signal H_CNT increases, the control signal generator 150 illustrated in FIG. 8 outputs the emission control signal ECS such that the pulse width of the emission control signal EMj increases in the blank period BP.

Figure 15:
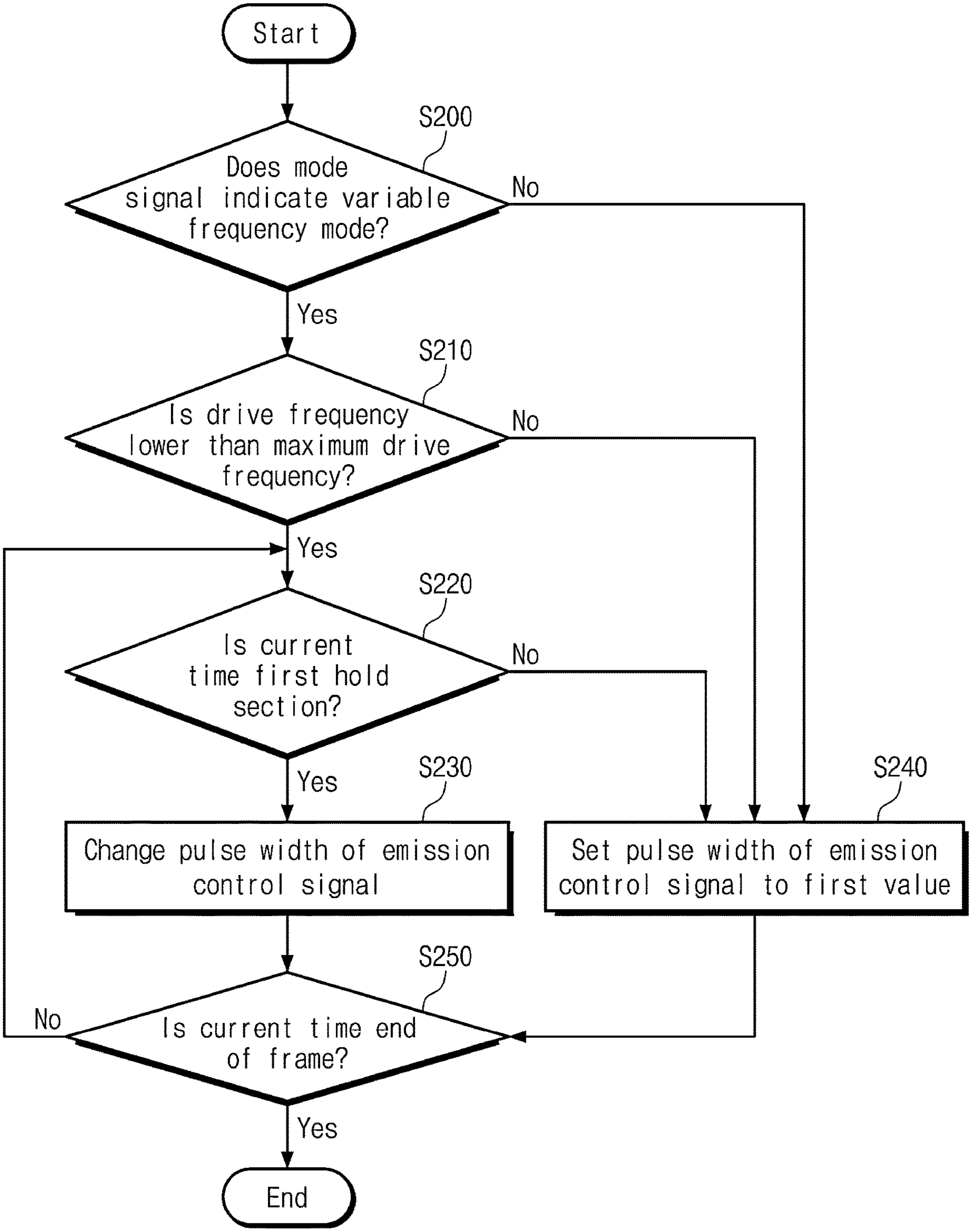
FIG. 15 is a flowchart illustrating an embodiment of a method of driving a display device, according to the invention.

As illustrated in FIGS. 11, 13, and 14, during the blank period BP, the pulse width of the emission control signal EMj may be changed in one of various ways. FIG. 15 is a flowchart illustrating a method of driving a display device, according to the invention.

A method of driving the display device will be described with reference to the driving controller 100 illustrated in FIG. 8, but the invention is not limited thereto.

Referring to FIGS. 8, 10, and 15, the mode determiner 120 determines an operation mode based on the control signal CTRL and outputs the mode signal MD corresponding to the operation mode (operation S200).

When the mode signal MD does not indicate the variable frequency mode, for example, the mode signal MD indicates the normal mode, the control signal generator 150 outputs the emission driving signal ECS such that the pulse width of the emission control signals EM1 to EMn has the first value (operation S240).

When the mode signal MD indicates the variable frequency mode, the first counter 130 may be reset in synchronization with a vertical synchronization signal (not illustrated) within the control signal CTRL and may perform a count in synchronization with a horizontal synchronization signal (not illustrated).

The control signal generator 150 determines whether the driving frequency of the current frame is lower than the maximum driving frequency based on the first count signal H_CNT (operation S210).

When the mode signal MD indicates the variable frequency mode but the first count signal H_CNT is less than or equal to a preset value (e.g., 2200 in FIG. 10), the control signal generator 150 determines that the current time is in the active period AP, and outputs the emission driving signal ECS such that the pulse width of the emission control signals EM1 to EMn has a preset first value (operation S240).

When the mode signal MD indicates the variable frequency mode and the first count signal H_CNT is greater the preset value (e.g., 2200 in FIG. 10), the control signal generator 150 determines that the current time is in the blank period BP, and determines whether the current time is the first hold section (operation S220).

While the mode signal MD indicates the variable frequency mode, the second counter 140 outputs the second count signal C_CNT in synchronization with a clock signal of a preset frequency. The frequency of the clock signal provided to the second counter 140 may be twice (e.g., 480 Hz) of the maximum driving frequency (e.g., 240 Hz). In an embodiment, the frequency of the clock signal provided to the second counter 140 may be the same as the frequency of the emission control signal EMj.

In an embodiment, when the second counter 140 is a 1-bit counter, the count value of the second count signal C_CNT output from the second counter 140 may be '0' or '1'. When the current time is the first hold section H1, the second count signal C_CNT output from the second counter 140 may be the first count value (e.g., '0'), and when the current time is the second hold section H2, the second count signal C_CNT output from the second counter 140 may be the second count value (e.g., '1').

When the mode signal MD indicates the variable frequency mode, the first count signal H_CNT is greater than a preset value (e.g., 2200), and the second count signal C_CNT is '0', the control signal generator 150 outputs the emission driving signal ECS for changing the pulse width of the emission control signals EM1 to EMn to the second value greater than the first value (operation S230).

When the mode signal MD indicates the variable frequency mode, the first count signal H_CNT is greater than a preset value (e.g., 2200), and the second count signal C_CNT is '1', the control signal generator 150 outputs the emission driving signal ECS for changing the pulse width of the emission control signals EM1 to EMn to the first value (operation S240).

The light emission driving circuit EDC illustrated in FIG. 1 outputs the emission control signals EM1 to EMn in response to the emission driving signal ECS. In this case, the pulse width of each of the emission control signals EM1 to EMn may be changed based on the emission driving signal ECS.

When the current time is the end of one frame (operation S250), the operation of one frame of the driving controller 100 is terminated.

The display device DD (refer to FIG. 1) may set a pulse width of each of the emission control signals EM1 to EMn for every frame by the driving method illustrated in FIG. 15.

Figure 16:
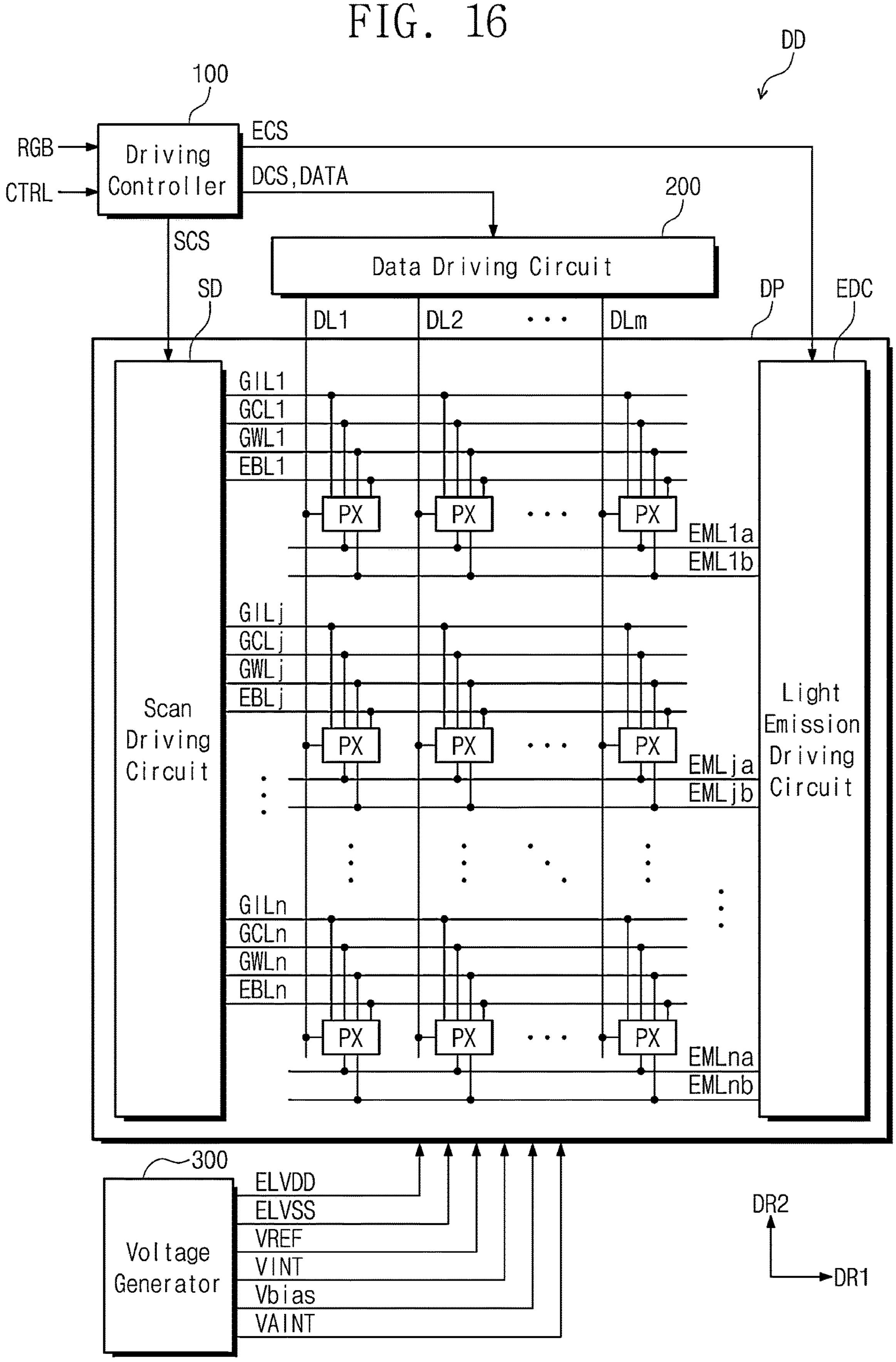
FIG. 16 is a block diagram illustrating an embodiment of a display device according to the invention.

FIG. 16 is a block diagram illustrating an embodiment of a display device according to the invention.

The display device DD illustrated in FIG. 16 is similar to the display device DD shown in FIG. 1, and thus the same reference numerals are used for the same components and additional descriptions will be omitted to avoid redundancy.

Referring to FIG. 16, the display device DD includes the display panel DP, the driving controller 100, the data driving circuit 200, and the voltage generator 300.

The display panel DP illustrated in FIG. 16 includes scan lines GIL1 to GILn, GCL1 to GCLn, GWL1 to GWLn, EBL1 to EBLn, emission control lines EML1*a* to EMLna and EML1*b* to EMLnb, and the data lines DL1 to DLm. Each of the plurality of pixels PX may be electrically connected to four scan lines and two emission control lines. In an embodiment, as illustrated in FIG. 16, pixels PX in a first row may be connected to the scan lines GIL1, GCL1, GWL1, and EBL1 and the emission control lines EML1*a* and EML1*b*, for example. In addition, pixels in a j-th row may be connected to the scan lines GILj, GCLj, GWLj, and EBLj and the emission control lines EMLja and EMLjb.

In an embodiment, the voltage generator 300 generates the first driving voltage ELVDD, the second driving voltage ELVSS, the reference voltage VREF, a first initialization voltage VINT, a bias voltage Vbias, and a second initialization voltage VAINT.

Figure 17:
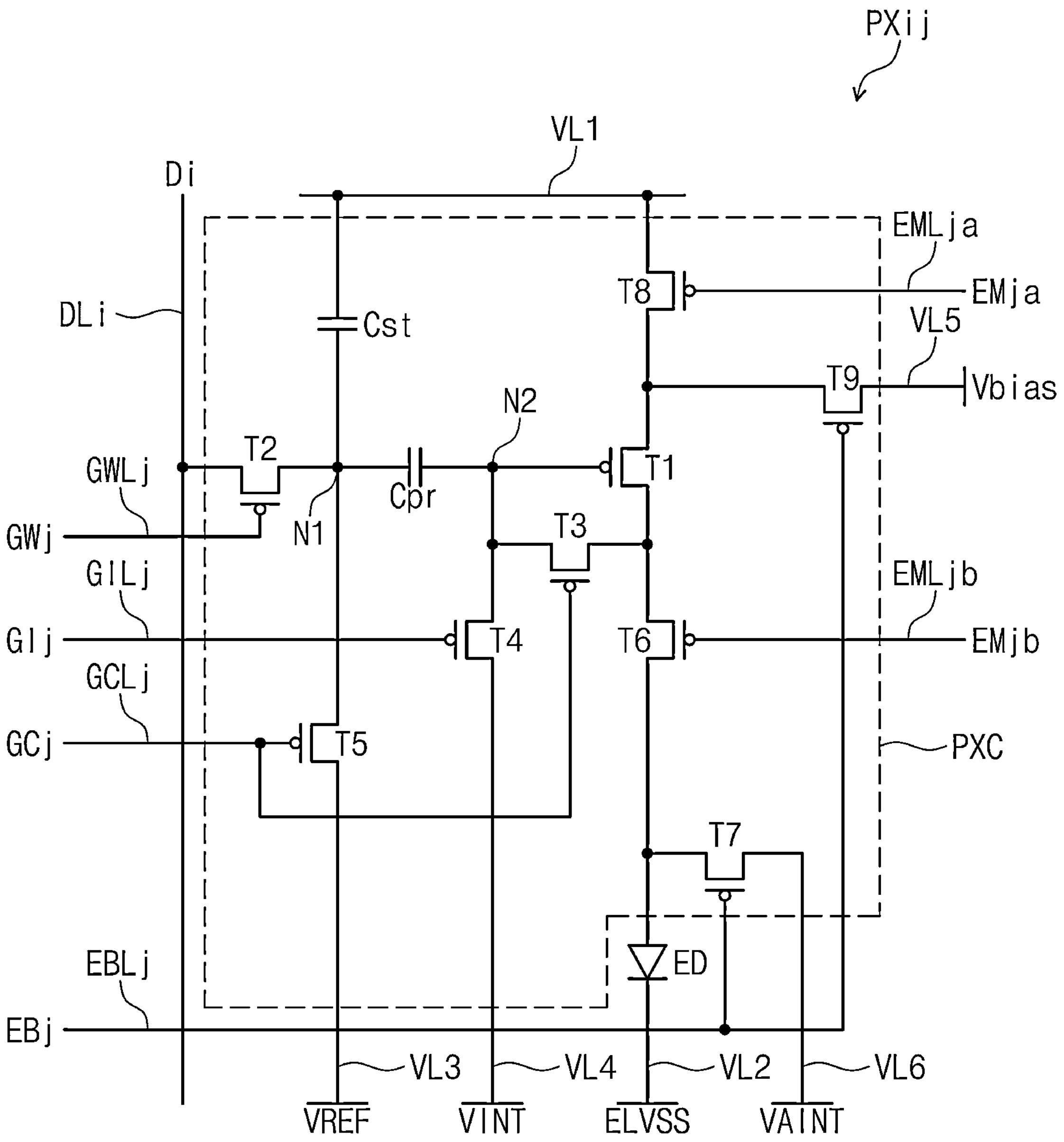
FIG. 17 is an equivalent circuit diagram of a pixel illustrated in FIG. 16.

FIG. 17 is an equivalent circuit diagram of a pixel illustrated in FIG. 16.

FIG. 17 illustrates an equivalent circuit diagram of an embodiment of a pixel PXij connected to the i-th data line DLi of the data lines DL1 to DLm, j-th scan lines GILj, GCLj, GWLj, and EBLj of scan lines GIL1 to GILn, GCL1 to GCLn, GWL1 to GWLn, and EBL1 to EBLn, and j-th emission control lines EMLja and EMLjb of emission control lines EML1*a* to EMLna and EML1*b* to EMLnb, illustrated in FIG. 16.

Each of the plurality of pixels PX illustrated in FIG. 16 may have the same circuit configuration as the equivalent circuit diagram of the pixel PXij illustrated in FIG. 17.

Referring to FIG. 17, the pixel PXij includes the pixel circuit PXC and at least one light-emitting device (e.g., light-emitting diode) ED. In an embodiment, it is described that the one pixel PXij includes one light-emitting device ED.

The pixel circuit PXC includes first to nineth transistors T1, T2, T3, T4, T5, T6, T7, T8, and T9 and capacitors Cst and Cpr. In an embodiment, each of the first to nineth transistors T1 to T9 is a P-type transistor having an LTPS semiconductor layer. In another embodiment, all of the first to ninth transistors T1 to T9 may be N-type transistors. In another embodiment, at least one of the first to nineth transistors T1 to T9 may be a P-type transistor, and the remaining transistors may be N-type transistors.

In addition, the circuit configuration of the pixel according to the invention is not limited to FIG. 17. The pixel circuit PX illustrated in FIG. 17 is only one of embodiments. In an embodiment, the circuit configuration of the pixel PXij may be modified and implemented, for example.

The scan lines GILj, GCLj, GWLj, and EBLj may transfer the scan signals GIj, GCj, GWj, and EBj, respectively, and the emission control lines EMLja and EMLjb may transfer the emission control signals EMja and EMjb. The data line DLi transfers the data signal Di. The data signal Di may have a voltage level corresponding to the image signal RGB input to the display device DD (refer to FIG. 16). First to sixth driving voltage lines VL1 to VL6 may respectively transfer the first driving voltage ELVDD, the second driving voltage ELVSS, the reference voltage VREF, the first initialization voltage VINT, the bias voltage Vbias, and the second initialization voltage VAINT to the pixel Pxij. In an embodiment, the bias voltage Vbias may be, for example, about 4 volts (V) to about 7 V.

The capacitor Cst may be connected between the first driving voltage line VL1 and the first node N1. The capacitor Cpr is connected between the first node N1 and the second node N2.

The first transistor T1 includes a first electrode connected to the first driving voltage line VL1 through the eighth transistor T8, a second electrode electrically connected to an anode of the light-emitting device ED through the sixth transistor T6, and a gate electrode.

The second transistor T2 includes a first electrode connected to the data line DLi, a second electrode connected to the first node N1, and a gate electrode connected to the scan line GWLj. The second transistor T2 may transfer the data signal Di received through the data line DLi to the first node N1 in response to the scan signal GWj received through the scan line GWLj.

The third transistor T3 includes a first electrode connected to the second electrode of the first transistor T1, a second electrode connected to the second node N2, and a gate electrode connected to the scan line GCLj. The third transistor T3 may connect the gate electrode of the first transistor T1 to the second electrode of the first transistor T1 in response to the scan signal GCj received through the scan line GCLj.

The fourth transistor T4 includes a first electrode connected to the second node N2, a second electrode connected to the fourth driving voltage line VL4 (or an initialization voltage line VL4), and a gate electrode connected to the scan line GILj. The fourth transistor T4 transfers the initialization voltage VINT received through the fourth driving voltage line VL4 to the second node N2 in response to the scan signal GIj received through the scan line GILj.

The fifth transistor T5 includes a first electrode connected to the first node N1, a second electrode connected to the third driving voltage line VL3 (or the reference voltage line VL3), and a gate electrode connected to the scan line GCLj. The fifth transistor T5 may be turned on depending on the scan signal GCj received through the scan line GCLj, and may transfer the reference voltage VREF to the first node N1.

The sixth transistor T6 includes a first electrode connected to the second electrode of the first transistor T1, a second electrode connected to the anode of the light-emitting device ED, and a gate electrode connected to the emission control line EMLjb. The sixth transistor T6 may be turned on by the emission control signal EMjb received through the emission control line EMLjb to electrically connect the second electrode of the first transistor T1 to the light-emitting device ED.

The seventh transistor T7 includes a first electrode connected to the anode of the light-emitting device ED, a second electrode connected to the sixth driving voltage line VL6, and a gate electrode connected to the scan line EBLj. The seventh transistor T7 is turned on depending on the scan signal EBj received through the scan line EBLj, and to electrically connects the anode of the light-emitting device ED to the sixth driving voltage line VL6.

The eighth transistor T8 includes a first electrode connected to the first driving voltage line VL1, a second electrode connected to the first electrode of the first transistor T1, and a gate electrode connected to the emission control line EMLja. The eighth transistor T8 may be turned on by the emission control signal EMja received through the emission control line EMLja to electrically connect the first driving voltage line VL1 to the first electrode of the first transistor T1.

The nineth transistor (or a bias transistor) T9 includes a first electrode connected to the first electrode of the first transistor T1, a second electrode connected to the fifth driving voltage line VL5, and a gate electrode connected to the scan line EBLj. The nineth transistor T9 is turned on by the scan signal EBj received through the scan line EBLj to electrically connect the fifth driving voltage line VL5 to the first electrode of the first transistor T1.

The light-emitting device ED includes the anode connected to the second electrode of the sixth transistor T6 and a cathode connected to the second driving voltage line VL2.

Figure 18:
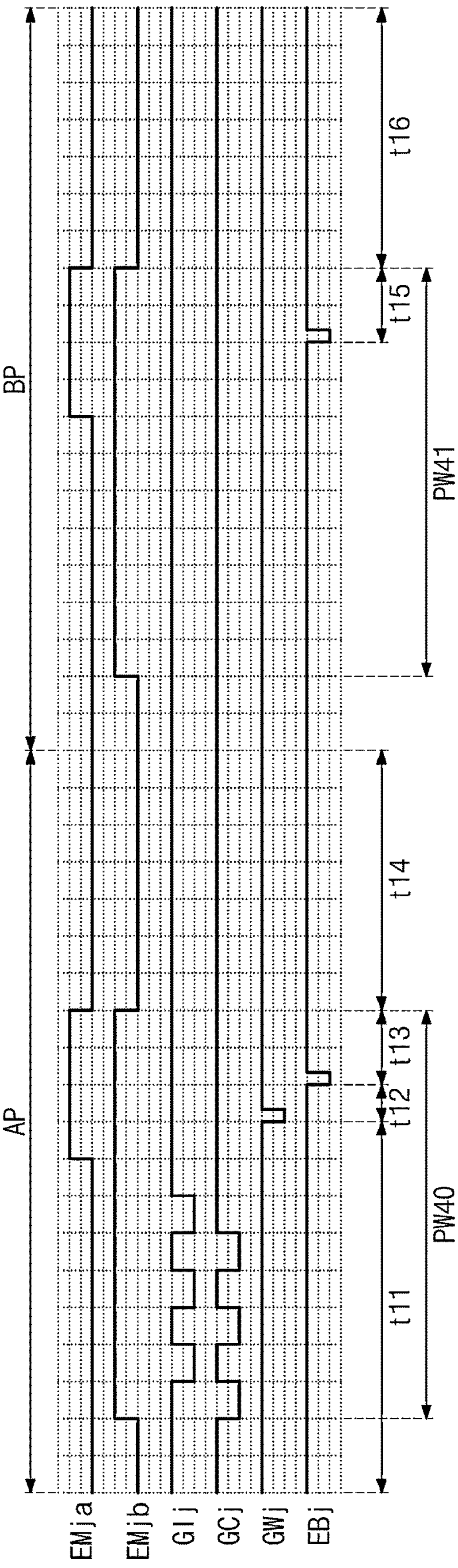
FIG. 18 is a timing diagram for describing an operation of an active period and a blank period of a pixel illustrated in FIG. 17.

FIG. 18 is a timing diagram for describing an operation of an active period AP and a blank period BP of a pixel illustrated in FIG. 17.

Referring to FIG. 18, the active period AP may include first to fourth sections t11 to t14, and the blank period BP may include fifth and sixth sections t15 and t16.

Referring to FIGS. 17 and 18, during the first section t11 of the active period AP, the emission control signal EMja is at an active level (e.g., a low level), and the emission control signal EMjb is at an inactive level (e.g., a high level). That is, during the initialization section, the eighth transistor T8 is turned on and the sixth transistor T6 is turned off.

When the scan signal GIj transitions to an active level (e.g., a low level) during the first section t11, the fourth transistor T4 is turned on so that the first initialization voltage VINT is provided to the second node N2. The first transistor T1 may be turned on while the scan signal GIj is at an active level.

When the scan signal GCj transitions to the active level during the first section t11, the third transistor T3 is turned on to electrically connect the gate electrode and the second electrode of the first transistor T1. The first transistor T1 turned on by the initialization voltage VINT may provide a compensation voltage ELVDD-Vth corresponding to a difference between the first driving voltage ELVDD and a threshold voltage (also referred to as Vth) of the first transistor T1 to the second node N2.

When the scan signal GCj transitions to an active level (e.g., a low level) during the first section t11, the fifth transistor T5 is turned on so that the first initialization voltage VREF is provided to the second node N1.

Therefore, as the scan signals GIj and GCj alternately transition to the active level, the reference voltage VREF may be applied to the first node N1, which is one end of the capacitor Cpr, and the compensation voltage ELVDD-Vth may be applied to the second node N2, which is the other end of the capacitor Cpr. The first driving voltage ELVDD and the reference voltage VREF may be applied to opposite ends of the capacitor Cst.

The first section t11 may be an initialization and compensation section for initializing the gate electrode of the first transistor T1 and compensating for the threshold voltage Vth of the first transistor T1.

As the scan signal GCj transitions to the active level in the first section t11, the voltage of the gate electrode of the first transistor T1 may be set as the compensation voltage ELVDD-Vth. As the scan signals GIj and GCj alternately transition to the active level several times in the first section t11, the compensation time may be sufficiently secured, and thus it is possible to minimize that the voltage across the capacitor Cpr and the voltage of the gate electrode of the transistor T1 are affected by the data signal Di of the previous frame.

When the second section t12 starts, the emission control signal EMja transitions to the inactive level and the scan signal GWj transitions to the active level. As the scan signal GWj transitions to the active level, the second transistor T2 is turned on. The voltage of the data signal Di provided to the data line DLi, that is, a data voltage Vdata, may be transferred to the first node N1 through the second transistor T2.

As the voltage of the first node N1 changes from the reference voltage VREF to the voltage VREF-Vdata reduced by the data voltage Vdata, the voltage provided to the gate electrode of the first transistor T1 through the capacitor Cst also varies from the compensation voltage ELVDD-Vth by the voltage VREF-Vdata. That is, the voltage of the gate electrode of the first transistor T1 is ELVDD-Vth+VREF-Vdata.

The second section t12 may be a writing section in which the data voltage Vdata corresponding to the data signal Di is written into the capacitor Cst.

As the scan signal EBj transitions to the active level in the third section t13, the seventh transistor T7 and the ninth transistor T9 are turned on.

When the seventh transistor T7 is turned on, the current of the anode of the light-emitting device ED may be bypassed to the sixth driving voltage line VL6. When the ninth transistor T9 is turned on, the bias voltage Vbias may be applied to the first electrode of the first transistor T1.

In this embodiment, it is illustrated and described that the scan signal EBj is commonly provided to the gate electrode of the seventh transistor T7 and the gate electrode of the ninth transistor T9, but the invention is not limited thereto. In an embodiment, scan signals provided to the gate electrode of the seventh transistor T7 and the gate electrode of the ninth transistor T9 may be different signals.

The third section t13 may be a bypass section in which the current of the anode of the light-emitting device ED is bypassed to the sixth driving voltage line VL6.

During the fourth section t14, all of the scan signals GIj, GCj, GWj, and EBj may be maintained at the inactive level. When the fourth section t14 starts, the emission control signals EMja and EMjb transition to the active level. As the eighth transistor T8 and the sixth transistor T6 are turned on by the emission control signals EMja and Emjb, a current path may be formed between the first driving voltage line VL1 and the light-emitting device ED through the eighth transistor T8, the first transistor T1 and the sixth transistor T6.

The current flowing through the light-emitting device ED is proportional to $(VGS-Vth)^2$, which is the square voltage of the difference between the gate-source voltage (also referred to as VGS) of the first transistor T1 and the threshold voltage Vth of the first transistor T1. Since the voltage level of the gate electrode of the first transistor T1 is (ELVDD-Vth+VREF-Vdata), the current flowing through the light-emitting device ED is proportional to (VREF- Vdata)$^2$, which is the square voltage of the difference between the reference voltage Vref and the data voltage Vdata corresponding to the data signal Di. That is, the threshold voltage Vth of the first transistor T1 may not affect the current flowing through the light-emitting device ED. The fourth section t14 may be an emission section of the light-emitting device ED.

In the fifth section t15 of the blank section BP, the emission control signals EMja and EMjb and the scan signals GIj, GCj, and GWj may be maintained at the inactive level.

When the scan signal EBj transitions to the active level in the fifth section t15 of the blank period BP, the seventh transistor T7 and the eighth transistor T8 are turned on.

When the seventh transistor T7 is turned on, the current of the anode of the light-emitting device ED may be bypassed to the sixth driving voltage line VL6. When the nineth transistor T9 is turned on, the bias voltage Vbias may be applied to the first electrode of the first transistor T1. As the bias voltage Vbias is provided to the first electrode of the first transistor T1 in the blank period BP, a luminance deviation due to the hysteresis characteristic of the first transistor T1 may be reduced.

The fifth section t15 may be a bias section in which a bias voltage Vbias is provided to the first electrode of the first transistor T1.

During the sixth section t16, all of the scan signals GIj, GCj, GWj, and EBj may be maintained at the inactive level. When the sixth section t16 starts, the emission control signals EMja and EMjb transition to the active level. As the eighth transistor T8 and the sixth transistor T6 are turned on by the emission control signals EMja and EMjb, a current path may be defined between the first driving voltage line VL1 and the light-emitting device ED through the eighth transistor T8, the first transistor T1 and the sixth transistor T6. The first transistor T1 may maintain a turned-on state by charges charged by the capacitors Cst and Cpr.

In the active period AP, the pulse width of the emission control signal EMjb has a first value PW40. In the blank period BP, the pulse width of the emission control signal EMjb has a second value PW41. FIG. 18 illustrates that the first value PW40 and the second value PW41, which are the pulse widths of the emission control signal EMjb, are the same. In the blank period BP, as described above with reference to FIGS. 8 to 15, the second value PW41 which is the pulse width of the emission control signal EMjb may be changed to a value greater than the first value PW40.

In an embodiment of the invention, the display device having such a configuration may adjust the amount of current provided to the light-emitting device by changing the pulse width of the emission control signal during a blank period. Therefore, the display device may uniformly maintain the amount of light from the light-emitting device even when the frequency of an input image signal is changed. Accordingly, it is possible to prevent a change in luminance according to a change in the frequency of the input image signal.

Although an embodiment of the invention has been described for illustrative purposes, those skilled in the art will appreciate that various modifications, and substitutions are possible, without departing from the scope and spirit of the invention as disclosed in the accompanying claims. Accordingly, the technical scope of the invention is not limited to the detailed description of this specification, but should be defined by the claims.

What is claimed is:

1. A display device comprising:

a light-emitting device;

a first transistor; and a second transistor connected between the first transistor and the light-emitting device, and including a gate electrode which receives an emission control signal, wherein, when a driving frequency is a second frequency different from a first frequency, one frame includes an active period and a blank period, and wherein, during the active period, a pulse width of the emission control signal has a first value, and during the blank period, the pulse width of the emission control signal has a second value different from the first value.

2. The display device of claim 1, wherein the emission control signal includes an off-section in which the second transistor is turned off and an on-section in which the second transistor is turned on, and wherein the off-section corresponds to the pulse width of the emission control signal.

3. The display device of claim 1, wherein the second frequency is lower than the first frequency.

4. The display device of claim 3, wherein a frequency of the emission control signal is higher than the first frequency.

5. The display device of claim 4, wherein the blank period includes a first hold section and a second hold section, wherein, during the first hold section, the pulse width of the emission control signal has the second value, and wherein, during the second hold section, the pulse width of the emission control signal has the first value.

6. The display device of claim 4, wherein the blank period includes a first blank period and a second blank period, wherein the first blank period includes a first hold section and a second hold section, wherein the second blank period includes a third hold section and a fourth hold section, wherein, in each of the first hold section and the third hold section, the pulse width of the emission control signal has the second value, and wherein, in each of the second hold section and the fourth hold section, the pulse width of the emission control signal has the first value.

7. The display device of claim 4, wherein the blank period includes a first blank period and a second blank period, wherein the first blank period includes a first hold section and a second hold section, wherein the second blank period includes a third hold section and a fourth hold section, wherein, in each of the first hold section and the second hold section, the pulse width of the emission control signal has the second value, and wherein, in each of the third hold section and the fourth hold section, the pulse width of the emission control signal has a third value greater than the second value.

8. The display device of claim 4, wherein the blank period includes a first blank period and a second blank period, wherein the first blank period includes a first hold section and a second hold section, wherein the second blank period includes a third hold section and a fourth hold section, wherein, in the first hold section, the pulse width of the emission control signal has the second value, and wherein, in the second hold section, the pulse width of the emission control signal has a third value greater than the second value, wherein, in the third hold section, the pulse width of the emission control signal has a fourth value greater than the third value, and wherein, in the fourth hold section, the pulse width of the emission control signal has a fifth value greater than the fourth value.

9. The display device of claim 1, further comprising a first driving voltage line, and wherein the first transistor includes:

a first electrode connected to the first driving voltage line;

a second electrode; and a gate electrode, and wherein the second transistor includes:

a first electrode connected to the second electrode of the first transistor; and a second electrode connected to the light-emitting device.

10. The display device of claim 9, further comprising:

a first node;

a first capacitor connected between the first driving voltage line and the first node;

a second capacitor connected between the first node and the gate electrode of the first transistor;

a third transistor coupled between the second electrode of the first transistor and the gate electrode of the first transistor;

a fourth transistor connected between the gate electrode of the first transistor and a second driving voltage line;

a fifth transistor connected between the first node and a third driving voltage line;

a sixth transistor connected between a data line and the first node; and a seventh transistor connected between the second electrode of the second transistor and the second driving voltage line.

11. The display device of claim 10, wherein a gate electrode of the sixth transistor receives a scan signal, and wherein the scan signal transitions to an active level such that the sixth transistor is turned on during the active period, and is maintained at an inactive level during the blank period.

12. A display device comprising:

a display panel including a pixel connected to scan lines, an emission control line, and a data line, the pixel including:

a light-emitting device;

a first transistor; and a second transistor connected between the first transistor and the light-emitting device and including a gate electrode which receives an emission control signal;

a scan driving circuit which outputs scan signals respectively to the scan lines;

a light emission driving circuit which outputs an emission control signal to the emission control line; and a driving controller which controls the scan driving circuit and the light emission driving circuit, wherein, when a driving frequency is a second frequency different from a first frequency, one frame includes an active period and a blank period, and wherein, during the active period, a pulse width of the emission control signal has a first value, and during the blank period, the pulse width of the emission control signal has a second value different from the first value.

13. The display device of claim 12, wherein the driving controller sets the pulse width of the emission control signal to the first value during the active period when the driving frequency is the second frequency in a variable frequency mode, and provides a light emission driving signal which sets the pulse width of the emission control signal to the second value to the light emission driving circuit during the blank period, and wherein the light emission driving circuit outputs the emission control signal in response to the light emission driving signal.

14. The display device of claim 13, wherein the driving controller includes:

a mode determiner which receives a control signal, to determine an operation mode based on the control signal, and to output a mode signal;

a first counter which outputs a first count signal in response to the control signal when the mode signal indicates the variable frequency mode;

a second counter which outputs a second count signal when the mode signal indicates the variable frequency mode; and a control signal generator which outputs the light emission driving signal in response to the control signal, the mode signal, the first count signal, and the second count signal.

15. The display device of claim 14, wherein, when the mode signal indicates the variable frequency mode, the first count signal is greater than a preset value, and the second count signal is a first count value, the control signal generator outputs the light emission driving signal which sets the pulse width of the emission control signal to the second value.

16. The display device of claim 14, wherein, when the mode signal indicates the variable frequency mode, the first count signal is greater than a preset value, and the second count signal is a first count value, the control signal generator outputs the light emission driving signal which sets the pulse width of the emission control signal to the first value.

17. The display device of claim 14, wherein, when the mode signal indicates the variable frequency mode and the first count signal is equal to or less than a preset value, the control signal generator outputs the light emission driving signal which sets the pulse width of the emission control signal to the first value.

18. A driving controller comprising:

a controller which:

receives a control signal, to determine an operation mode based on the control signal, and to output a mode signal;

outputs a light emission driving signal in response to the control signal when the mode signal indicates a variable frequency mode;

wherein, when a driving frequency is a second frequency different from a first frequency, one frame includes an active period and a blank period, and wherein the controller output the light emission driving signal so that a pulse width of an emission control signal has a first value during the active period, and the pulse width of the emission control signal has a second value different from the first value during the blank period.

19. The driving controller of claim 18, wherein the controller includes:

a mode determiner which receives the control signal and outputs the mode signal;

a first counter which outputs a first count signal in response to the control signal when the mode signal indicates the variable frequency mode;

a second counter which outputs a second count signal when the mode signal indicates the variable frequency mode; and a control signal generator which outputs the light emission driving signal in response to the control signal, the mode signal, the first count signal, and the second count signal.

20. The driving controller of claim 19, wherein, when the mode signal indicates the variable frequency mode, the first count signal is greater than a preset value, and the second count signal is a first count value, the control signal generator outputs the light emission driving signal which sets the pulse width of the emission control signal to the second value, wherein, when the mode signal indicates the variable frequency mode, the first count signal is greater than the preset value, and the second count signal is a second count value, the control signal generator outputs the light emission driving signal which sets the pulse width of the emission control signal to the first value, and wherein, when the mode signal indicates the variable frequency mode and the first count signal is equal to or less than the preset value, the control signal generator outputs the light emission driving signal which sets the pulse width of the emission control signal to the first value.

21. An electronic device comprising:

a display panel including a pixel connected to scan lines, an emission control line, and a data line, the pixel including:

a light-emitting device;

a first transistor; and a second transistor connected between the first transistor and the light-emitting device and including a gate electrode which receives an emission control signal;

a scan driving circuit which outputs scan signals respectively to the scan lines;

a light emission driving circuit which outputs an emission control signal to the emission control line; and a driving controller which controls the scan driving circuit and the light emission driving circuit, wherein, when a driving frequency is a second frequency different from a first frequency, one frame includes an active period and a blank period, and wherein, during the active period, a pulse width of the emission control signal has a first value, and during the blank period, the pulse width of the emission control signal has a second value different from the first value.

* * * * *